(12) United States Patent
Sato et al.

(10) Patent No.: US 8,255,312 B2
(45) Date of Patent: *Aug. 28, 2012

(54) ISSUING MACHINE AND ISSUING SYSTEM

(75) Inventors: Michihiro Sato, Tokyo (JP); A. Udaya Shankar, Silver Spring, MD (US)

(73) Assignee: Michihiro Sato, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/067,357

(22) Filed: May 26, 2011

(65) Prior Publication Data

US 2011/0231297 A1  Sep. 22, 2011

Related U.S. Application Data

(63) Continuation of application No. 11/449,810, filed on Jun. 9, 2006, now Pat. No. 8,024,249, which is a continuation-in-part of application No. 11/149,556, filed on Jun. 10, 2005, now Pat. No. 7,401,043.

(51) Int. Cl.
  *G06Q 40/00* (2012.01)
(52) U.S. Cl. ............ 705/36 R; 705/35; 705/39; 705/42; 705/44
(58) Field of Classification Search ................ 705/36 R, 705/35, 39, 42, 44
See application file for complete search history.

(56) References Cited

U.S. PATENT DOCUMENTS

| | | | |
|---|---|---|---|
| 5,765,141 A | 6/1998 | Spector | |
| 5,970,150 A | 10/1999 | Sansone | |
| 6,021,202 A * | 2/2000 | Anderson et al. | 705/54 |
| 6,073,120 A | 6/2000 | Shiota et al. | |
| 6,208,978 B1 | 3/2001 | Walker et al. | |
| 6,233,565 B1 | 5/2001 | Lewis et al. | |
| 6,874,682 B2 | 4/2005 | Utz et al. | |
| 6,901,382 B1 | 5/2005 | Richards et al. | |
| 6,981,637 B2 | 1/2006 | Nagayoshi et al. | |

(Continued)

FOREIGN PATENT DOCUMENTS

EP  1341113 A1  9/2003

(Continued)

OTHER PUBLICATIONS

"Big News Gets Low-Kay Treatment from Citibank; Direct Mail Carries Message of Expanded ATM Investment Service", Bank Advertising News, vol. 19, No. 6, Nov. 28, 1994, p. 3.

(Continued)

*Primary Examiner* — Jagdish Patel
*Assistant Examiner* — Kevin Poe
(74) *Attorney, Agent, or Firm* — Stites & Harbison PLLC; Juan Carlos A. Marquez, Esq.

(57) ABSTRACT

An issuing system for issuing unmodifiable and/or unforgeable hardcopy documents or securities includes a server and a plurality of issuing machines connected to the server via a network. Each of the issuing machines receives an ID recording medium provided by a potential purchaser, retrieves an identification recoded in the received ID recording medium, requests the potential purchaser to input request for a transaction of the security or fixed rate financing instrument, processes the requested transaction by retrieving information via a network from the server, and prints out on demand a hardcopy of the security or fixed rate financing instrument as purchased by the potential purchaser and a checksum thereon. A method for forming a new market with the issuing system.

38 Claims, 13 Drawing Sheets

U.S. PATENT DOCUMENTS

| | | | |
|---|---|---|---|
| 7,096,494 B1* | 8/2006 | Chen | 726/9 |
| 7,158,152 B2 | 1/2007 | Jardin et al. | |
| 7,162,035 B1 | 1/2007 | Durst et al. | |
| 7,401,043 B2* | 7/2008 | Sato | 705/36 R |
| 2001/0018739 A1* | 8/2001 | Anderson et al. | 713/176 |
| 2002/0012445 A1 | 1/2002 | Perry | |
| 2002/0023048 A1 | 2/2002 | Buhannic et al. | |
| 2002/0107766 A1* | 8/2002 | Sioufi | 705/35 |
| 2002/0180953 A1 | 12/2002 | De Jung et al. | |
| 2003/0044020 A1 | 3/2003 | Aboba et al. | |
| 2003/0103625 A1 | 6/2003 | Naccache et al. | |
| 2004/0088333 A1 | 5/2004 | Sidman | |
| 2004/0215959 A1 | 10/2004 | Cook et al. | |

FOREIGN PATENT DOCUMENTS

| | | |
|---|---|---|
| JP | 09-093561 | 4/1997 |
| JP | 11-086101 | 3/1999 |
| JP | 2002-024730 | 1/2002 |
| JP | 2002-024738 | 1/2002 |
| JP | 2002-163449 | 6/2002 |
| JP | 2003-118276 | 4/2003 |
| WO | WO-0180539 A2 | 10/2001 |
| WO | WO-0209003 A1 | 1/2002 |

OTHER PUBLICATIONS

Giesen, Lauri, "How Buck Rogers is Bailing Out ATMs", Banking Management V68n11, Nov. 1992, p. 65.

"Japanese Banks Decide to Open ATMs to Securities Firms", Comline-Tokyo Financial Wire, Jul. 11, 1997, 1 page.

Power, Carol, "On-Line Banking: New NCR Offerings Link Back Office, Front End", Ameridan Banker, May 15, 1997, p. 6.

ATM Machines: http://en.wikipedia.org/wiki/Automated_teller_machine, 3 pages.

ATM Machines: http://www.howstuffworks.com/atm.htm, 8 pages.

Secure cryptoprocessors http://en.wikipedia.org/wiki/Secure_cryptoprocessor, 2 pages.

F. Edward Boas, "How to make an unforgeable document", http://b435-boas.stanford.edu/home/science/unforgeable/unforgeable.pdf, 3 pages.

Security printing: http://en.wikipedia.org/wiki/Security_printing, 3 pages.

Optical character recognition: http://en.wikipedia.org/wiki/Optical_character_recognition, 4 pages.

Cryptography: http://en.wikipedia.org/wiki/Cryptography, 10 pages.

Cryptographic hash function: http://en.wikipedia.org/wiki/Cryptographic_hash_function, 6 pages.

Keyed-hash message authentication code (HMAC): http://en.wikipedia.org/wiki/HMAC, pages.

SHA (Secure Hash Algorithm): http://en.wikipedia.org/wiki/SHA, 8 pages.

Symmetric-key cryptography: http://en.wikipedia.org/wiki/Symmetric_key_algorithm, 3 pages.

DES (Data Encryption Standard): http://en.wikipedia.org/wiki/Data_Encryption_Standard, 9 pages.

AES (Advanced Encryption Standard): http://en.wikipedia.org/wiki/Advanced_Encryption_Standard 6 pages.

Secure Shell (SSH): http://en.wikipedia.org/wiki/SSH, 5 pages

European Search Report dated Aug. 28, 2006.

"The Japan-U.S. Latest Instance and Method of System Construction from Finance Delivery Strategy to Online Securities Trading", On-Line Banking, Nikkei Business Publications, Inc., Japan, Dec. 1998, cover page, and pp. 94-105.

\* cited by examiner 21A,22B

Fig. 10

| Securities Identification | 20040404 | | | | | 20030201 | | | | | 20001025 | | | | |
|---|---|---|---|---|---|---|---|---|---|---|---|---|---|---|---|
| Name of Public Work | ODAIBA CASINO | | | | | NUMAZU MUNICIPAL HOSPITAL | | | | | SAITAMA STATION FRONT BUILDING | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Construction of casino in Odaiba and its operation | | | | | Construction of municipal hospital in Numazu and its operation | | | | | Construction of building in front of Saitama station and its operation | | | | |
| Planner | Japan Gov | | | | | South Korea Gov | | | | | China Gov | | | | |
| Executor | The Metropolis of Tokyo and some management company in Las Vegas | | | | | Numazu City | | | | | Saitama City | | | | |
| Guarantor | United States Gov | | | | | Japan Gov | | | | | China Gov | | | | |
| Redemption Period | 10 years | | | | | 5 years | | | | | 8 years | | | | |
| Interest Rate (Annual) | 3% | | | | | 2% | | | | | 2.5% | | | | |
| Guaranteed Limit | 70% | | | | | 80% | | | | | 80% | | | | |
| Dividend | None | | | | | None | | | | | None | | | | |
| Comment of Related Parties | Comment from the Governor of Tokyo | | | | | Comment from the Mayor of Numazu | | | | | Comment from the Mayor of Saitama | | | | |

Fig. 11

| Securities Identification | 20020401 | | | | | 20020938 | | | | | 20060825 | | | | |
|---|---|---|---|---|---|---|---|---|---|---|---|---|---|---|---|
| Name of Public Work | JAPANESE HIGHWAY | | | | | STOMACH CANCER SUPPRESSANT DEVELOPMENT PROJECT | | | | | XX SATELLITE PROJECT | | | | |
| Face Value (Million yen) | 100 | 50 | 10 | 5 | 1 | 100 | 50 | 10 | 5 | 1 | 100 | 50 | 10 | 5 | 1 |
| Contents of Public Work | Operation of Tomei Highway | | | | | Development of stomach cancer suppressant | | | | | Launching and operation of XX satellite | | | | |
| Planner | | | | | | Japan | | | | | Japan / National Space Development Agency | | | | |
| Executor | Japan Highway Public Corporation | | | | | Takeda Chemical Industries, Ltd. | | | | | National Space Development Agency | | | | |
| Guarantor | Japan Gov | | | | | Japan / UFJ Bank | | | | | Japan / Mitsubishi Heavy Industries, Ltd. | | | | |
| Redemption Period | None | | | | | 10 years | | | | | 6 years | | | | |
| Interest Rate (Annual) | 3% | | | | | 2.5% | | | | | 2% | | | | |
| Guaranteed Limit | 60% | | | | | 50% | | | | | 85% | | | | |
| Dividend | Yes | | | | | None | | | | | None | | | | |
| Comment of Related Parties | Comment from the Prime Minister of Japan | | | | | Comment from the President of Takeda Chemical Industries, Ltd. | | | | | Comment from National Space Development Agency and Director of the Science and Technology Agency | | | | |

Fig. 12

| Securities Identification | 20100962 | | | | | 20904829 | | | | |
|---|---|---|---|---|---|---|---|---|---|---|
| Name of Public Work | YY Oil Field Project | | | | | ZZ Natural Gas Project | | | | |
| Face Value (Million yen) | 100 | 50 | 10 | 5 | 1 | 100 | 50 | 10 | 5 | 1 |
| Contents of Public Work | Development and Management of YY Oil Field | | | | | Development and Management of ZZ Natural Gas | | | | |
| Planner | Japan / Russia / Gulf Oil Co. | | | | | Japan / Canada / Occidental Oil Co. | | | | |
| Executor | Gulf Oil Co. | | | | | Occidental Oil Co. | | | | |
| Guarantor | Japan / Russia Govs | | | | | Japan / Canada Govs | | | | |
| Redemption Period | 10 years | | | | | 9 years | | | | |
| Interest Rate (Annual) | 5% | | | | | 2.5% | | | | |
| Guaranteed Limit | 70% | | | | | 65% | | | | |
| Dividend | None | | | | | None | | | | |
| Comment of Related Parties | Comment from the President of Russia | | | | | Comment from the President of Canada | | | | |

Buy procedure executed by the ASD computer upon customer "buy" request:

1. start transaction with customer                  // display output
2. get customer details                           // keypad input
    (name, address, social security number, etc.)
3. get details of desired certificate             // keypad input
    (issuing company, face value, duration of certificate, etc.)
4. get details of payment method             // card reader input
    (bank account number, PIN, etc.)
5. start transaction with ASD host             // network output
6. send details of desired certificate to ASD host    // network output
7. receive reply from ASD host                 // network input
8. if ASD host's reply indicates certificate not available
    inform customer                             // display output
9. if ASD host's reply indicates certificate available
      send payment information to ASD host      // network output
      receive reply from ASD host indicating      // network input
          what to print (including checksum)
          type of paper to use,
          and whether a scan is to be taken
      print certificate on the appropriate paper    // printer-scanner output
      obtain scan if needed                     // printer-scanner input
      send scan to ASD host                   // network output
      dispense printed certificate to customer      // printer-scanner output
10. print transaction status on local printer
11. end transaction with ASD host              // network output
12. end transaction with customer              // display output

Figure 16

Sell procedure executed by the ASD computer upon customer "sell" request:

1. start transaction with customer // display output
2. wait for customer to insert printed certificate into scanner
3. scan printed certificate // printer-scanner input
4. get payment details // card reader and/or keypad input
   (bank account number, PIN, etc.)
5. start transaction with ASD host // network output
6. send certificate scan, payment details to ASD host
   // network output
7. receive reply from ASD host // network input
8. if ASD host's reply indicates certificate is valid and payment has been made
       inform customer that the sale has succeeded // display output
       print VOID on certificate and store locally // printer-scanner output
9. if ASD host's reply indicates certificate is invalid
       inform customer that certificate is invalid // display output
       return certificate to customer // printer-scanner output
10. print transaction status on local printer
11. end transaction with ASD host // network output
12. end transaction with customer // display output

Figure 17

ISSUING MACHINE AND ISSUING SYSTEM

This application is a Continuation of U.S. patent application Ser. No. 11/449,810 filed on Jun. 9, 2006 now U.S. Pat. No. 8,024,249, which is a Continuation-in-Part application of U.S. patent application Ser. No. 11/149,556 filed on Jun. 10, 2005 now U.S. Pat. No. 7,401,043. The contents of the Application, including specification, claims, drawings and summary are hereby incorporated by reference. Priority is claimed to U.S. patent application Ser. No. 11/449,810 filed on Jun. 9, 2006, which claims the priority of U.S. application Ser. No. 11/149,556 filed on Jun. 10, 2005, which claims the priority of Ser. No. 10/233,995 filed on Aug. 30, 2002, Ser. No. 10/358,432 filed on Feb. 4, 2003, Ser. No. 10/376,358 filed on Feb. 27, 2003 and Ser. No. 10/444,870 filed on May 23, 2003 which claims the priority dates of Sep. 3, 2001, Feb. 5, 2002, Feb. 27, 2002, Mar. 11, 2002, May 31, 2002, Sep. 3, 2002 and Feb. 4, 2003, the filing dates of Japanese Patent Application Nos. 2001-265178, 2002-27550, 2002-51085, 2002-65123, 2002-158595, 2002-257497 and 2003-27127, respectively.

BACKGROUND OF THE INVENTION

1. Field of the Invention

The present invention relates to an issuing system including a plurality of issuing machines for selling, generating, and printing newly-issued securities or fixed rate financing instruments that include selected features of common stock and bonds, and a method for establishing a market with the system. In particular, each of the issuing machines can print unmodifiable and/or unforgeable hardcopy documents or securities, and scan/identify whether a served hardcopy document is a printed unmodifiable and/or unforgeable hardcopy documents or securities previously generated by an issuing machine of the system.

2. Description of the Prior Art

Stock certificates are a well-known type of certificate of securities that represent the positions or rights of stockowners. A business operator issues stock certificates that represent the positions or rights of investors in return for acquiring funds from the investors. Those who purchased stock certificates (i.e., stockholders) are allowed to participate in the operation of the company that issued the stock certificates based on the positions and rights given to them in return. In other words, stockholders can attend stockholders meetings, participate in voting, and demand dividends from the company that issued stock certificates.

Moreover, stockholders are allowed to sell the stock certificates to third parties. By selling the stocks at prices exceeding the original purchase prices, they can earn profits that are equal to the differences between them.

Bonds are another type of well-known securities that are issued by national or local governments, entities established based on special laws, or private enterprises for obligations they have to the public as a whole. Bonds are characterized in that they have predetermined redemption dates, after which the bond issuers are to pay to the bond owners corresponding principals and interests. Bond owners are also allowed to sell bonds at prices exceeding the original purchase prices and earn profits that are equal to the differences between them.

However, a business operator sometimes may not be able to acquire sufficient funds only by stock issues. Moreover, by issuing bonds, a business operator becomes obligated to pay the principals and interests after the redemption dates, so that bond issuing results in a high burden for a business owner.

U.S. Patent Application Publication No. 2002/0107766 provides a financial instrument certificate purchasing system for issuing, transferring and redeeming financial certificates which are representative of underlying publicly-traded property. The system permits an individual to gift a third party with a certificate which represents a company's security or other financial instrument, while not itself consisting of the financial instrument. However, the system does not sell, generate or print the financial instrument itself. In addition, the certificates are ordered via a personal computer, rather than any publicly-available standing-alone issuing machine like an ATM.

The existing "online trading terminals" available to the general public is merely a computer terminal at which a person can do on-line securities trading. The online trading terminal only deals with virtual (online) resources and prints paper copies of online transaction receipts, but does not print any unmodifiable and/or unforgeable securities. In addition, the online trading terminal does not re-circulate/recycle any printed unmodifiable and/or unforgeable securities.

The conventional ATM machine only dispenses money and collects money/checks, rather than dispensing and collecting certificates of securities. Some ATM machines, such as the one described in U.S. Pat. No. 6,981,637, automatically check and ensure that the money dispensed or collected is valid (i.e., not a forgery) by scanning and trying to identify the kind and amount of the paper money. However, these ATM machine only re-circulate the paper money by storing and then dispensing per-printed paper money (by a government), but not printing new unmodifiable and/or unforgeable paper money. In addition, these ATM machine only take limited kinds of paper money, usually of the same currency issued by an identical government such that it can use data stored in its own memory for authentication without accessing a central server.

There are money changers (e.g., devices that accept money bills in vending machines), which have sensors that look for certain features on the inserted bills (e.g., ultra-violet threads, particular microprinting, etc.) and check the validity of bills and distinguish bills of different sizes.

Up to this point, the circulation of actual securities is restricted only to be sold or exchanged at specified locations, such as branch offices of financial institutions, such as a bank or a securities brokerage. If one party desires to sell a hardcopy security to another, the transaction of the hardcopy securities would have to be completed at one of these branch offices. The branch office can check the authenticity of the hardcopy and record the serial number of the security and its new owner. A transaction of a counterfeit hardcopy can be detected and stopped by a person via checking a global (across all locations) database of these documents and transactions.

There is a need for a securities issuing system with a plurality of issuing machines placed at various convenient locations to for potential customers to offer to buy securities, to buy securities, to transfer bought securities to a depository, to print out the bought unforgeable hardcopy securities, and to recycle the printed unforgeable hardcopy securities back into the system.

Beside securities, there are other unmodifiable and/or unforgeable documents, such as postage stamps, anti-counterfeit stickers and/or packages, paper money, checks, banknotes, commercial papers, passports, driver's licenses, identity cards, smart cards, credit cards, academic transcripts, etc. protected by different techniques including: (1) Special paper: heavy paper, perhaps with colored or forensic fibers, or transparent windows, etc; (2) Watermarks: pattern impressed on paper by varying paper density; (3) Microprinting: text that is too small to be accurately re-producible; the text may include information specific to the security (e.g., serial number); (4) Holograms; (5) Metallic or UV sensitive threads embedded in paper; or other high-resolution printing techniques. The techniques involve the use of technology that is not available to the general public, or is available only at prohibitive cost. Some techniques (e.g., high-resolution printing) increase the cost of the printer. Some techniques (e.g., special paper) increase the cost of the materials.

There is a need for a cost effective method to print an unmodifiable and/or unforgeable document that are not reproducible with conventional copiers.

SUMMARY OF THE INVENTION

It is a purpose of this invention to provide a system with a plurality of issuing machines placed at various convenient locations to for potential customers to offer to buy securities, to buy securities, to transfer bought securities to a depository, or to print out the bought unmodifiable and/or unforgeable hardcopy securities, and to recycle the printed unmodifiable and/or unforgeable hardcopy securities back into the system.

The system of the present invention comprises a novel method of issuing a new financial product different, from stocks and bonds, that will provide investors who trade stocks and bonds with a new chance of earning profits by creating and marketing a financial instrument that provides for partial guarantee of a security by a third party.

Therefore, an intension of the present invention is to provide a securities issuing system for issuing bonds for obtaining funds from private sectors to promote investments in public works projects for improving infrastructures even in a society under a depressed financial situation, as well as a new market forming method that enables the bonds issued by the securities issuing system to be marketed.

Another intention of the present invention is to provide a securities issuing system for issuing bonds, which does not specify the redemption date although the dividend, interest and guaranty are stated, thus providing a new means for enterprises to obtain funds more easily, and a new financial product for investors, different from stocks and bonds, for earning profits through transactions, as well as a new market forming method that enables the bonds issued by the securities issuing system to be marketed.

The above intentions can be obtained by an embodiment of the present invention in which a securities issuing system has a server in a securities issuing institution, a client in a user institution, and a securities issuing machine at a securities issuing site.

In an embodiment of the invention the server includes a means for transmitting information an offer, indicating securities available to the client and a means for receiving a bid or an offer to purchase securities. The server also has software capable of market making or creating an authorization to issue securities based, in part, on the bids or offers to purchase securities received from the client. The server also has means for receiving individual user identification information and user institution identification information. The server is also capable transmitting and authorization including the individual user identification information and the authorization to issue securities to the securities issuing machine. The server also has means for receiving a confirmation of the issue of securities from the securities issuing machine, accumulating a total of the securities confirmed as issued and calculating fees to charge the user institutions.

The preferred embodiment of the invention, the client means for transmitting the bid or offer to purchase securities to the server identification information about both the individual user the user institution to the server.

The third component of the preferred embodiment of the invention is a securities issuing machine. This securities issuing machine includes means for receiving the authorization to issue securities from and the individual user identification information from the server. The securities issuing machine is also capable reading an individual user's reference identification information from a recording medium and then collating or checking that individual user identification information received from the server with the individual user reference identification read from the recording medium. The securities issuing machine then makes a decision base on that collation or check and, if appropriate issues the securities detailed in the authorization to issue securities received from the server to the user. The securities issuing machine then transmits the result or the conformation of the transaction back to the server.

In one embodiment of the invention, securities issued are bonds for obtaining funds from private sectors, which are issued by the securities issuing institution in order to promote investments of private funds into public works for improving infrastructures, carrying a wording that a trusted entity, such as but limited to, the Government of Japan, a public entity, or a private enterprise of Japanese nationality, as well as the national government of a foreign country, a public entity, or a private enterprise of foreign nationality, either singularly by one of them, or jointly by two or more of them, serves as a guarantor or guarantors within a predetermined limit for principal reimbursement and interest payment liabilities to be born by the securities issuing institution and that the public works for improving infrastructures are planned and executed by the trusted entity.

In a further embodiment of the invention, the securities issuing system includes securities issued for acquiring funds by a business operator in exchange for the certificates of securities, on which written are a dividend wording describing that the business operator will distribute profits obtained as a result of business activities to persons who own the certificates of securities, an interest wording describing that the business operator will pay interests periodically to the persons who own the certificates of securities and a warranty wording describing that one or more trusted entities serves as a guarantor or guarantors within a predetermined limit for principal reimbursement and interest payment liabilities to be born by the securities issuing institution in case the business operator becomes unable to pay the interests according to the interest payment wording due to reasons such as a business failure.

In another embodiment of the invention, the securities issuing institution is a private urban development organization.

A further embodiment of the invention includes a method for forming a new market capable of making a person who has never purchased securities purchase securities issued by using the system, and trade those securities in the market as needed.

The present invention provides a means of issuing bonds related to project financing, where projects are public works such as infrastructure improvement projects. A person who wishes to purchase such a bond is able to see the contents of the public works to which the person is investing. Since the person can select the public works at will, in which his/her money is to be invested, this method enhances his/her desires for purchasing the bonds. Moreover, since the person's investment will never be used in public works to which he/her objects, the investor can purchase bonds with more confidence.

The present invention provides a private enterprise trying to execute public works such as infrastructure improvement projects a means of acquiring large sums of funds from private sectors to be invested into the public works such as infrastructure improvement projects through bond issuing.

This is because those who are buying bonds can be assured for the repayment as the principal and interests repayment liabilities of the bond issuers are warranted to certain fixed limits by the Government of Japan, a public entity, or a private enterprise of Japanese nationality, either singularly by one of them, or jointly by two or more of them so that the bond buyers are guaranteed to be able to collect the principal and interests safely within certain fixed limits even when the a private enterprise fails in the operation of the public works.

Moreover, the present invention provides a means of preventing the Government of Japan, a public entity, or a private enterprise of Japanese nationality from wasting tax money, because the warrants for the bond issuers' principal and interest repayment liabilities by the Government of Japan, a public entity, or a private enterprise of Japanese nationality, as well as the government of a foreign country, or a public entity of foreign nationality, are limited to certain levels that are determined fairly by an independent public institution.

Thus, the Government of Japan, a public entity, or a private enterprise of Japanese nationality, as well as the government of a foreign country, or a public entity of foreign nationality are not obliged to bear the full amounts of the bond issuers' principal and interests repayment liabilities when the operations of public works such as infrastructure improvement projects by a private enterprise fail as in the case of government guaranteed bonds.

Moreover, since securities that are not bound by the concept of redemption dates can be issued according to the present invention, a business operator can operate without having to bear the burden of principal repayment realistically speaking.

The owner of the securities issued under the present invention is eligible for dividends. He/she can earn interests as well. Furthermore, the owner of the securities is guaranteed for the repayment of the principal of the funds provided to the business operator by the Government of Japan, a public entity, or a private enterprise of Japanese nationality, as well as the government of a foreign country, or a public entity of foreign nationality either singularly by one of them, or jointly by two or more of them within a predetermined limit, if the business operator who issued the securities becomes unable to pay interests in accordance with the interest wording due to bankruptcy or poor business.

The securities issued according to this invention are a new kind of financial product which did not exist before. This product encourages people who have never bought securities to buy securities. Therefore, the invention can create a new financial market.

According to the invention, user institutions can apply for securities purchases through their clients, so that securities buyers can buy securities from their homes and offices.

According to the invention, the clients of the present securities issuing system are installed in each user institution, so that it is easy to control the securities purchase status by each user institution, and various services can be offered by each user institution to attract customers.

A user institution here means a securities company, a bank, a private enterprise, or a general buyer of securities. According to this invention, the users of this securities issuing system can purchase the securities without having to have cash at hand as long as the users have ID recording media.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein:

FIG. 10 shows a table of three kinds of fixed rate financing instruments of the invention including the one for an Odaiba Casino Project.

FIG. 11 shows a table of three kinds of fixed rate financing instruments of the invention including the one for a Japanese Highway Project.

FIG. 12 shows a table of two kinds of fixed rate financing instruments of the invention.

FIG. 16 Procedure executed by ASD 105 computer upon customer's buy request FIG. 17 Procedure executed by ASD 105 computer upon customer "sell" request

DETAILED DESCRIPTION OF THE PREFERRED EMBODIMENTS

Figure 1:
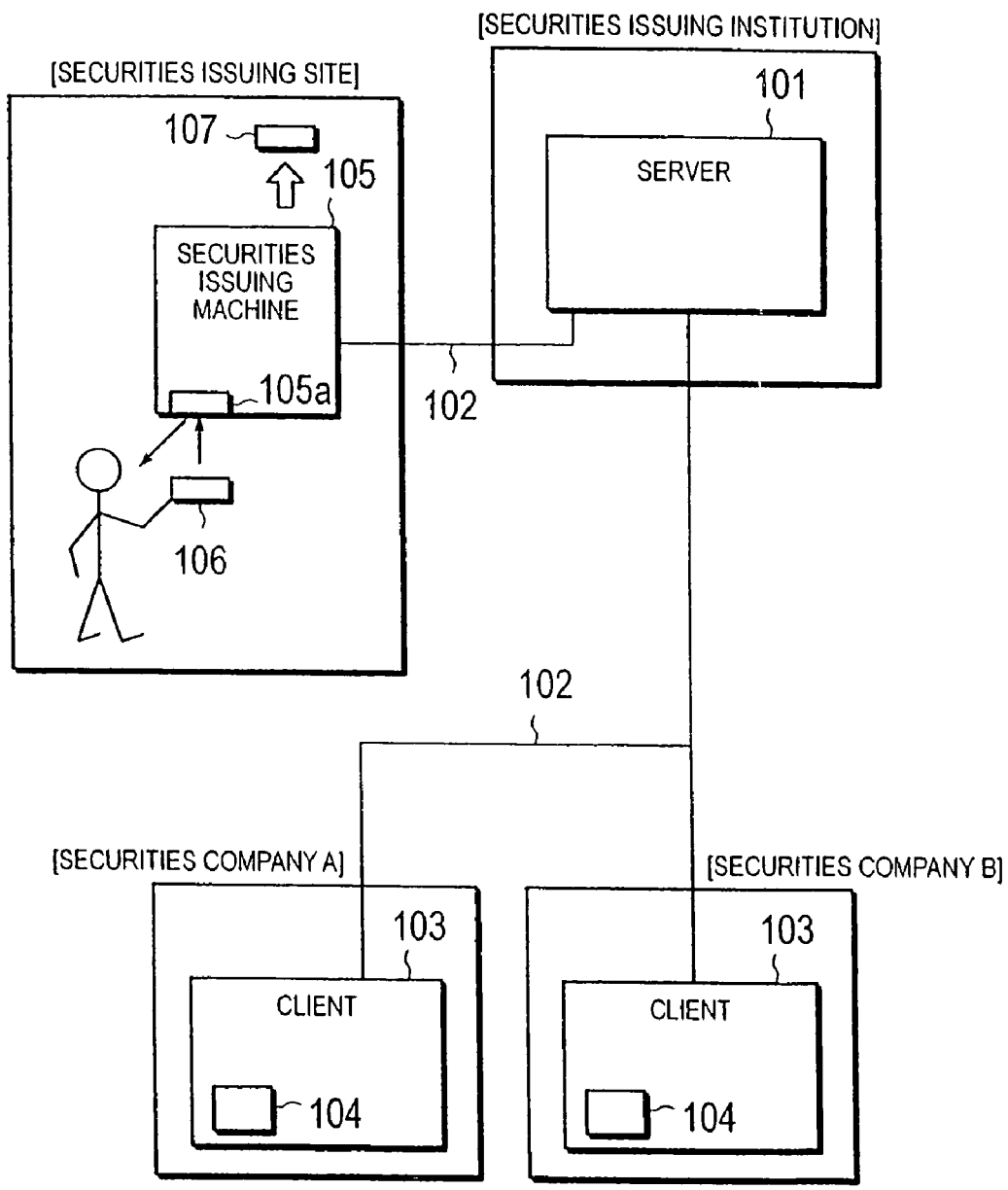
FIG. 1 is a diagram showing a securities issuing system according to a preferred embodiment of the present invention.

FIGS. 10-12 show examples of the fixed rate financing instruments which offer a dividend or are partially guaranteed by a third party to issuance as disclosed in U.S. patent application Ser. No. 11/148,406 filed on Jun. 9, 2005, which is incorporated herein by reference.

The fixed rate financing instrument has at least one issuing legal entity specified thereon which issues the financing instrument as evidence of debt to acquire funds to finance at least one operation, a face value specified thereon to be paid to the issuing legal entity in exchange for owning the financing instrument, a fixed interest rate specified thereon defining periodical interest payments to an instrument holder as a percentage of the face value, and at least one of (1) a guarantee ratio g being defined as a percentage of the interest payments and the face value to be paid back to the instrument holder as committed by at least one third party to issuance, if the legal entity defaults, $0<g<100$, and (2) at least one of a fixed-rate dividend d and a fixed-amount dividend to be paid to the instrument holder after an operation financed through the financing instrument starts making profits, the fixed-rate dividend d being defined as a percentage of the profits to be paid to the instrument holder periodically, $0<d<100$.

The security is a note, a stock, a treasury stock, a bond, a debenture, a certificate of interest or participation in a profit-sharing agreement or in oil, gas, or mineral royalty or lease, a collateral trust certificate, a pre-organization certificate or subscription, a transferable share, an investment contract, a voting-trust certificate, a certificate of deposit, for a security, a put, call, straddle, option, or privilege on a security, certificate of deposit, or group or index of securities, or a put, call, straddle, option, or privilege entered into on a national securities exchange relating to foreign currency, or an instrument commonly known as a 'security'; or a certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited.

A document contains information. It is usually intended to communicate or store collections of data. Documents could be seen to include any discrete representation of meaning, but usually it refers to something like a physical book, printed page(s) or a virtual document in electronic/digital format. A hardcopy document has content printed thereon, usually on paper, rather than contents read from a screen/display or data in a digital format. Examples of a hardcopy document includes teleprinter pages, facsimile pages, and computer printouts. Magnetic tapes, diskettes, and non-printed punched paper tapes are not a hard copy and do not constitute a part of a hardcopy document.

A certificate is an official document that gives proof and details of something, for example, personal status, educational achievements, ownership, or authenticity, such as a securities certificate, a certificate of deposit (CD). In computing and especially computer security and cryptography, the word certificate generally refers to a digital identity certificate, also known as a public key certificate.

FIG. 1 is a securities and financing instruments issuing system according to one embodiment of the invention. As shown in FIG. 1, the securities issuing system according to this embodiment is equipped with: a server 101 in a securities issuing institution, which may be an underwriter or a private corporation (including a private enterprise responsible for executing a public work project), that issues securities (including the unique fixed rate financing instruments, for example, as shown in FIGS. 10-12) based on bids or securities purchase offers; a client device 103 in each user institution (including securities brokerage companies, banks, credit card companies, PayPal®, or any financial institutes that keep accounts of the general public), which is connected to the server via a communications link 102 such as, but not limited to a telephone line or a wireless link; a securities issuing machine 105 (also referenced as an Automated Securities Dispenser, ASD), which may be located in each securities issuing site and which is connected to the server 101 via a communications line 102; and an identification (ID) recording media 106.

When the issuing institution is a private corporation (may be a privately-owned or publicly-traded company), newly-issued securities, such as stocks, bonds, or the unique fixed rate financing instruments, may be issued without using any underwriter or underwriting syndicate, as long as the issuing process satisfies the legal requirements in one respective country enforced by a governing body that oversees exchange of fixed rate financing instruments for review or registration as required by law, such as SEC in the US. Such offers to sell cannot be made before a registration statement has been filed with the SEC, and the offers can not be accepted until a registration statement becomes effective. After a registration statement is declared effective, sales literature can not be delivered unless accompanied or preceded by a final statutory prospectus, etc. According to the invention, a potential purchaser (an institutional investor or a member of the general public) can go to a standing-alone issuing machine to view prospectus and to offer to purchase and/or to purchase the newly-issued securities and financing instruments. Alternatively, the potential purchaser may offer to purchase or purchase the newly-issued securities and financing instruments via a physical site of a financial institution as described below. As such, the invention provides new market mechanisms which allow people to trade securities and fixed rate financing instruments more conveniently.

The client device 103 can be realized by a computer such as but not limited to a general-purpose computer, a dedicated terminal, an office computer, or a personal computer.

Dedicated securities purchase offer software 104 as well as various other kinds of application software are installed on the client device 103.

When the securities purchase offer software 104 is activated, the client device 103 is enabled to communicate with the server 101 and send securities purchase offers or bids to the server 101. The securities purchase offer software 104 may for instance, be lent or licensed by the security issuing institution to each user institution free of charge and is set up in such a way as to make securities purchase offers easier and smoother.

The client device 103 with its securities purchase offer software 104 running transmits information concerning the securities to be purchased and ID information concerning user individuals and the user institution to the server 101 in order to make securities purchase offers easier and smoother. This function of the client device 103 may be termed the bid or purchase request function.

The ID information concerning user individuals and the user institution transmitted from the client device 103 to the server 101 at the time of bidding for or requesting securities purchase is stored in an ID recording medium 106 as the individual user identification (ID) reference information. Although the ID recording medium 106 used in this embodiment is an ID card, the mode of the invention is not limited to it. The individual user identification (ID) reference information may be printed in any suitable form such as, but limited to, text, 2D or 3D bar codes, graphic codes, water marks, visual bio-identification photographs, signatures and/or finger or thumb prints, digitized voices, hand prints, finger/ thumb prints, or retinal (eye) images, etc. on a card or a storage medium. The individual user identification (ID) reference information may be carried by any suitable form such as, but limited to, a paper or plastic card, a magnetic strip (e.g., on a debt or credit card), a magnetic disk or tape, an electronic chip (e.g., on a credit or smart card), a personal digital assistant or a cell phone memory, or memory in other portable, hand-held, or palmtop devices, etc. The electronic personal data or bio-identification data can be verified by sampling on-site or retrieved from the storage medium to compare with an on-site or on-line database.

In the meantime, the server 101 of the securities issuing institution's purchase request accepting function establishes a securities purchase offer based on the securities purchase offer received from the client device 103. The securities purchase offer is an authorization to issue securities. For example, the server 101 searches a database to see if there are any unsold securities of the particular securities based on the securities information received from the client device 103. If the server ascertains that there are unsold securities matching the bid specifications, the server establishes the securities purchase offer or authorization to issue shares immediately. If there are no securities of the type specified in the client bid information, the server notifies the client device 103 that there are no securities to be sold.

It is so set up that the securities purchase offer, or authorization to issue securities, will not be established even if there are unsold securities are available if the ID information from the client device 103 was not properly transmitted.

When a securities purchase offer or authorization to issue securities is established, the server 101's wait instruction function transmits the or authorization to issue securities purchase information concerning the deal as well as the ID information concerning the securities purchase offer to the securities issuing machine 105 at the securities issuing site.

In one embodiment, the securities issuing machine 105 at the securities issuing site has a slot 105a for inserting, inputting or otherwise connecting, the ID recording medium 106. The issuing machine 105 is, by means of an ID reading function, also capable of reading the user's ID reference information recorded on the ID recording medium when the ID recording medium 106 is inserted, input or otherwise connected into the slot. The issuing machine 105 may be as automated as an automatic teller machine (ATM) so as to print and dispense a fixed rate financing instrument directly to a purchaser. Customers can buy printed certificates of securities at the ASD. Customers can also insert printed certificates of securities into the ASD 105 and have them sold or converted to on-line certificates. The printed certificates dispensed by the ASD 105 is unmodifiable and/or unforgeable.

A printed certificate is said to be unmodifiable if any change to the information on the certificate can be easily detected. Here, the term information on the certificate refers to its face value, serial number, issuer identification, issue date, expiry date, owner name, and so on. It does not refer to the type of paper on which the certificate is printed, nor does it refer to graphics (e.g., artwork) printed on the certificate (although a digitized version of the graphics can be included).

A printed certificate is said to be unforgeable if it cannot be duplicated without recourse to resources that are not available to the public (or available at prohibitive cost). Bank notes are a common example. Producing an unforgeable document usually entails using special paper and/or special printing. (Special papers include paper with colored or forensic fibers, paper with transparent windows, paper with holograms, and paper with watermarks. Special printing means high-resolution printing of text or special patterns that do not accurately reproduce on most photocopiers.)

Cryptographic checksums (usually over 100 binary digits long) are known as message digests, message authentication codes, integrity check-values, modification detection codes, or message integrity codes. Currently, cryptographic checksums are either 128 or 160 bits (binary digits) long. Assuming octal encoding, this can be represented by 32 or 40 decimal digits. This size is considered unbreakable for the near future (say the next 5-10 years). As computers become more powerful, the size will be increased (such as doubled). A cryptographic checksum is a mathematical value (called a checksum) that is assigned to a file and used to "test" the file at a later date to verify that the data contained in the file has not been maliciously (or accidentally) changed. A cryptographic checksum is created by performing a complicated series of mathematical operations (defined by a cryptographic algorithm) that takes as inputs the data in the file and a cryptographic key (a randomly-chosen large number, e.g., 50 to 100 binary digits) and outputs a fixed string of digits, which is then used as a checksum. The cryptographic algorithm itself is not usually secret. But the cryptographic key is secret. Without knowing the key, it is highly unlikely (i.e., computationally unfeasible) that one can change the data in the file and obtain the appropriate checksum.

A printed certificate may be desired to be unmodifiable but not necessarily unforgeable. For example, any transaction involving the certificate will be handled through a designated financial institution that keeps track of which certificates are outstanding and who their owners are. Whereas a printed certificate that can be traded like money (i.e., anonymously) has to meet the stronger condition of being unforgeable.

Cryptographic checksums are in a digital form to be transmitted electronically in data transmission and data storage A cryptographic checksum usually stored on disk or flash (both non-volatile storage) or RAM (volatile).

The current credit cards, id cards, and similar cards with magnetic stripes only use digital codes, but not cryptographic checksums. Smart cards have a processor and memory (volatile and non-volatile) for storing cryptograph quantities and executing cryptographic algorithms. But these quantities are not printed on the card or a hardcopy document.

Other certificates, such as driver licenses, passports, etc, only contain printed codes, such as digits, 2D or 3D bar codes, but not cryptographic checksums. The latest passports may incorporate smart card technology, but not any cryptographic checksum printed thereon.

The invention scans the cryptographic checksum printed on a hardcopy certificate, checks its validity with the ASD host 101 (or financial institutions underwriting or transacting securities), and accepts the certificate only if the cryptographic checksum matches.

Alternatively, the purchaser may designate a depository, such as a security breakage company or the like which the purchaser has an account with. In one embodiment of the invention, the issuing machine 105 also functions as an automatic teller machine (ATM) or other kiosks, such as paying routine bills, fees, and taxes (utilities, phone bills, social security, legal fees, taxes, etc.), loading monetary value into pre-paid cards (cell phones, tolls), conducting ticketing transactions (train, concert, etc.).

The issuing machine 105 may have custom circuit boards or use a computer with special software running on operating systems such as Windows, Linux, etc. The computer (a CPU, a RAM, a ROM, a disk, etc.) runs the software (operating system, applications) which controls the operation of the ASD.

The ASD 105 interacts with customers via input-output devices including keypad, display, card reader, and document printer-scanner. The ASD host 101 is part of a network of securities dealing financial institutions, and all interactions between the ASD 105 and the securities dealing financial institutions are handled via the ASD 105 host.

The ASD 105 interacts with the ASD host 101 via a communication link such as a dial-up line, leased-line, or local area network connected to the Internet. The ASD 105 also has the cryptoprocessor which executes the cryptography software for achieving secure communication between ASD 105 and ASD host 101 (and any other cryptographic operations needed). The ASD 105 has a backup battery to ensure normal operation and proper closing in the event of power failure. In-store issuing machine 105 may have its cryptoprocessor connected directly to the internet or other network, or via a modem over a dedicated telephone line then to the interne so as to connect to the server. The secure crypto processor is generally within a computer in a secure enclosure. The security of the issuing machine 105 relies on the integrity of the secure cryptoprocessor.

If appropriate, the issuing machine 105 then, by means of an issuing function, (1) prompts a pop-up screen for users to click-through to indicate whether they are located within a jurisdiction where the offering has been registered or is exempt from registration, or the site may be password-protected for investors who have otherwise been screened and given passwords, (2) prompts a pop-up screen for users to click-through to consent to electronic delivery/display a statutory prospectus, and to acknowledge that they have electronically received/reviewed the statutory prospectus, and then (3) issues the securities 107 based on the corresponding securities purchase offer information. The issuing machine 105 also prompts a statement that paper copies of the prospectus and other required SEC documents are available upon request from an identified contact. The issuing machine 105 also has an issue result transmitting function which is used to transmit confirmation of the securities issue to the server 101 as the security issue result information or confirmation.

Optionally, the server 101 and the issuing machine 105 supports real-time pricing for newly-issued securities on-line to the public based upon the offers to purchase and offers to sell available real-time, rather than traded on a regular, periodic basis, such as weekly, semi-weekly, or daily like in the current bond market.

Outdoor issuing machines 105 may be free-standing, like a kiosk, or built into the side of a building of financing entities, such as security brokerage companies, banks, post offices, etc. The issuing machines 105 placed at or inside locations such as malls, grocery stores, and restaurants. These entities may charge a processing fee for the arrangement. The security features of the issuing machines 105 include invulnerable physical structures, effectively safe dispensing mechanisms, etc. Additional security mechanisms known to one skilled in the art are installed for the outdoor issuing machines 105.

The issuing result or confirmation information of the securities 107 transmitted from the securities issuing machine 105 to the server 101 is accumulated on the database in the server 101 by means of an information accumulating function.

The server 101 of the securities issuing institution can further calculate the fees based on the accumulated issuing result information (post-issue settling function).

Customers can buy printed certificates from the ASD. Customers can also insert printed certificates into the ASD 105 and have them sold or converted to on-line certificates. The key feature of the ASD 105 is that it includes a printing function and a scanning function. It prints certificates for the customer that are unmodifiable and/or unforgeable. It also scans certificates inserted by the customer and verifies whether they were modified or forged. The print-scan feature is what makes the ASD 105 distinctive from a conventional ATM.

The ASD 105 makes a printed certificate unmodifiable by printing on the certificate a cryptographic checksum computed from the information of the certificate and a cryptographic key held in secret by the securities dealing financial institution. The ASD 105 makes a printed certificate unforgeable by using special papers. The difficulty of forging a document can be increased by using paper with a random embedded pattern (e.g., colored fibers) and recording the pattern (by scanning the document) when the certificate is issued; the recorded pattern, or scan, is referred to as the fingerprint of the document.

Let us now describe the operation of the embodiment constituted above. In the securities issuing system using ID information according to this embodiment, the client device 103 of each user institution is activated and operated by the operator to run the securities purchase offer software 104 installed in the client device 103. As the securities purchase offer software 104 is activated, the client device 103 is enabled to communicate with the server 101 of the securities issuing institution.

Next, the operator enters information concerning the securities desired to be purchased, enters into the client device 103 the user's individual ID information and the ID information concerning the user institution, which will in turn be transmitted from the client device 103 to the server 101 of the securities issuing institution in order to present the securities purchase offer or bid to the server 101 of the securities issuing institution.

The user's individual ID information and the ID information concerning the user institution to be transmitted to the server 101 of the securities issuing institution are the same as the information stored in the ID recording medium 106 as the user's ID reference information.

Upon receiving the securities purchase offer or bid from the client device 103, the server 101 of the securities issuing institution, in a market making operation, searches a database to see if there are any unsold securities of the particular securities based on the information from the client device 103. If there are unsold securities, a securities purchase offer is immediately established. Otherwise the client device 103 is notified that there are no securities matching the bid. The securities purchase offer will not be established even if there are unsold securities are available if the ID information from client device 103 was not properly transmitted.

When a securities purchase offer or authorization is established, the server 101 transmits the securities purchase information or authorization concerning the deal, as well as the appropriate ID information, to the securities issuing machine 105 provided in the securities issuing site. This completes the securities purchase offer or authorization procedure.

The user who made a securities purchase offer or bid goes to the securities issuing site with the ID recording medium 106 that stores the ID reference information. The user puts the ID recording medium 106 into the slot 105*a* of the securities issuing machine 105 of the securities issuing institution located at the securities issuing site.

The securities issuing machine 105 reads the information from ID recording medium 106, and collates the user's ID reference information read from the medium with the ID information received from the server 101, and issues the securities 107 based on the corresponding securities purchase offer information based on the collation result.

The securities issuing machine 105 further transmits confirmation of the securities issue to the server 101 as the security issue result or conformation information. The issuing result information of the securities 107 transmitted from the securities issuing machine 105 to the server 101 is accumulated on the database in the server 101.

The server 101 of the securities issuing institution can further calculate the fees based on the accumulated issuing result information as well as calculate the fees for each user institution's client device 103 or each user institution.

As can be seen from the above, since the client device 103 is installed at each user institution, each user institution can more easily manage its securities purchasing status. In particular, as the client device 103 can start up various other types of application software on its own, a wide range of applications, for example, causing the accounting application to read the securities purchase status data, are possible.

On the other hand, the securities issuing institution can provide various services for each user institution depending on this mode of the embodiment. For example, it is possible to arrange a post-issue lump sum settling based on the securities issuing result information or provide discount service depending on the number of securities issued for each user institution. This makes it possible for the securities issuing institution to monopolize, practically speaking, each user institution's securities purchase needs.

Also, according to this embodiment, processes within the institution such as charging forward and its registration become unnecessary as the fee settling procedures are done for the user institutions.

The client device 103 has various functions related to the securities purchase offer such as the collating function for the securities purchase offers. Moreover, it is possible to arrange various services from the securities issuing institution to be transmitted from the server 101 of the securities issuing institution to the client device 103.

Although the client device 103 transmits the ID information of each user institution and, the individual user in the user institution directly to the securities issuing institution in this embodiment, the invention is not limited to that mode.

In an alternate embodiment of the invention, the client device 103 may also present a securities purchase offer or bid by transmitting the ID information indirectly to the issuing institution by presenting a bid displaying or including ID information to the Bank of Japan or a financial institution. In this event, the Bank of Japan or the financial institution transmits the ID information from the client device 103 to the securities issuing institution.

Figure 2:
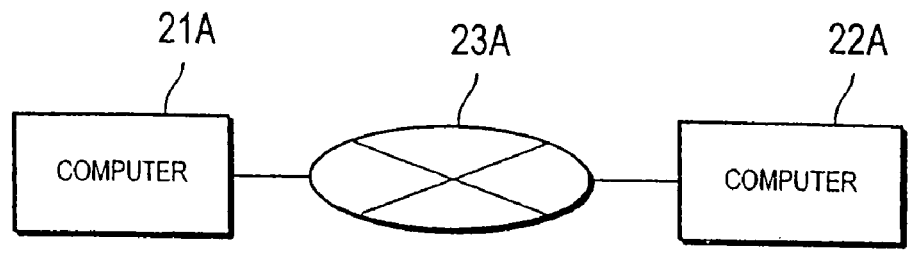
FIG. 2 is a block diagram of the overall structure of an embodiment of the present invention.

FIG. 2 is a block diagram showing the entire structure of the securities information offering system according to the second embodiment of the present invention. The securities information offering system according to this embodiment comprises a computer 21A installed at a securities company and a computer 22A owned by an investor, which are interconnected communicably via a network 23A. The number and type of the devices connected to the network 23A are not limited by the example shown in FIG. 2.

Figure 3:
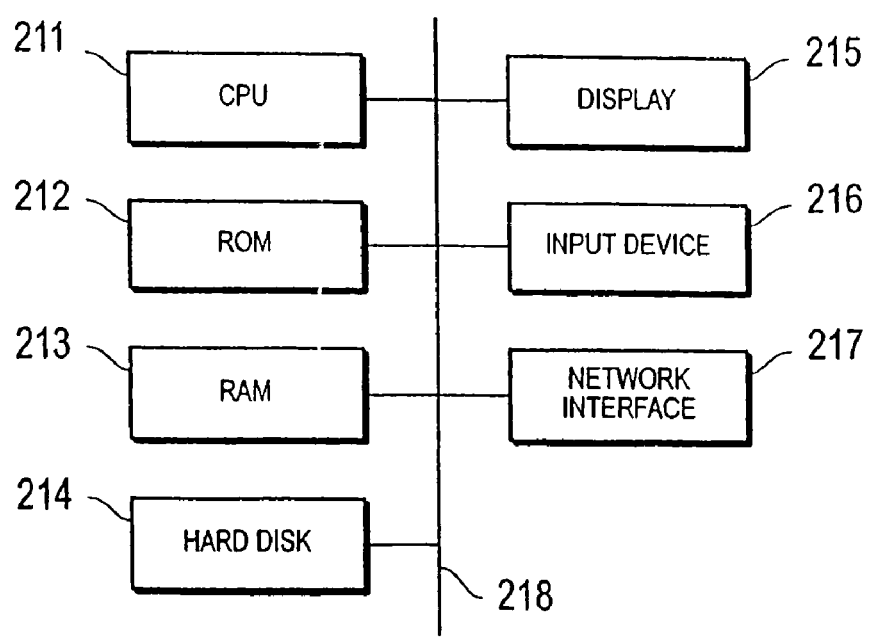
FIG. 3 is a block diagram showing greater detail of the computers depicted in FIG. 2.

FIG. 3 is a block diagram showing the constitution of the computers 21A and 22A according to this embodiment. With reference to FIG. 3, the computers 21A and 22A each has a CPU 21 for conducting various control and arithmetic processes, a ROM 212 for storing various programs and data, a RAM 213 for temporarily storing data as a working area, a hard disk 214 for storing various programs and data, a display 215 for conducting various displays, an input device 216 such as a keyboard and a mouse for conducting various inputs, a network interface 217 for communicating with other devices on the network, and others, all of which area interconnected via a bus 218 for exchanging signals.

The network 23A can be a public network such as a telephone network, a mobile communication network, an ISDN and a packet exchange network, or a computer network such as a LAN, a WAN and the Internet.

Figure 4:
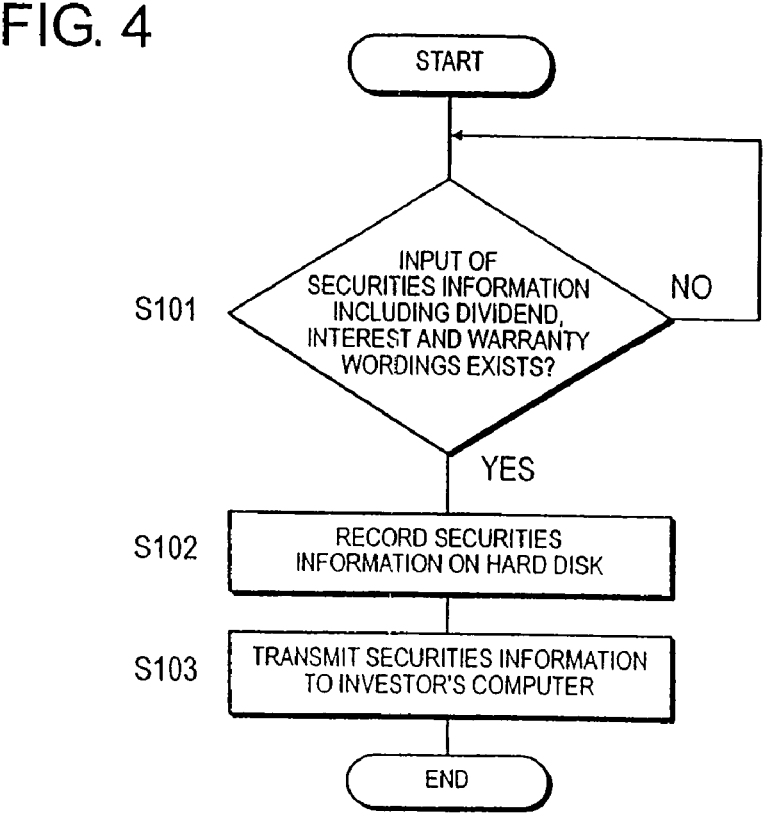
FIG. 4 is a flowchart representing a segment of a program executed by the securities company's computer according to the embodiment depicted in FIG. 3.
Figure 5:
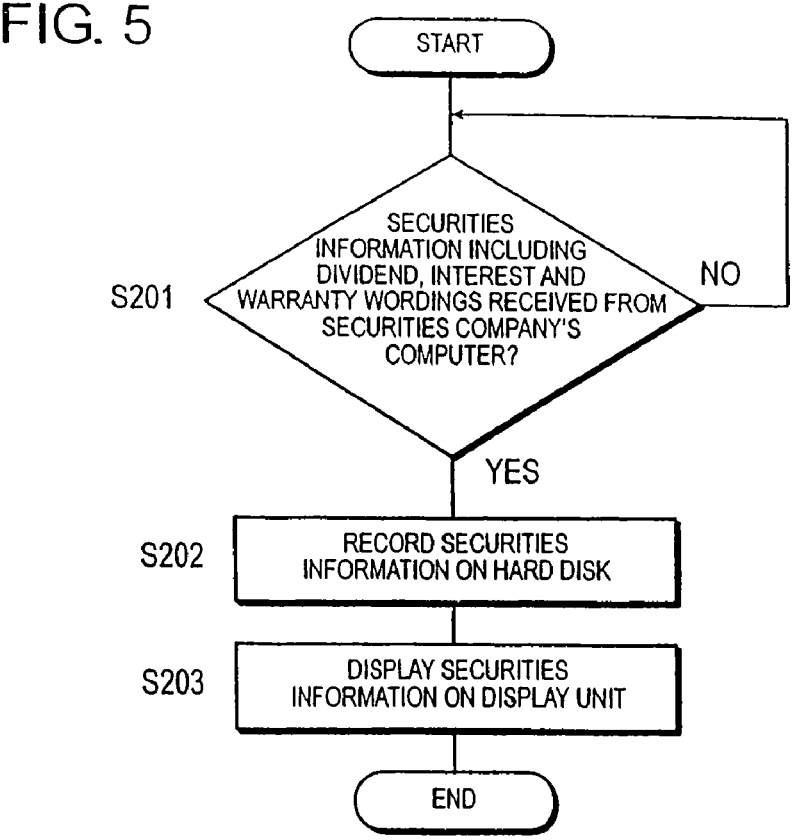
FIG. 5 is a flowchart representing a segment of a program executed by the investor's computer according to the embodiment depicted in FIG. 3.

Next, the outline of the operation of the securities information offering system according to this embodiment will be described. FIG. 4 and FIG. 5 are the flowcharts of the procedures of the securities information offering processes of the computers 21A and 22A. The algorithms shown as the flowcharts of FIG. 4 and FIG. 5 are stored as the control programs in either the ROM 212 or the hard disk 214 of the computers 21A and 22A respectively, and are executed by the CPU 21.

In FIG. 4, the computer 21A installed in the securities company waits for securities information including the dividend wording 3, the interest wording 4, and the warranty wording 5 to be entered (S101: No). The operator at the securities company enters into the computer 21A via the input device 216 the dividend wording 3, the interest wording 4, and the warranty wording 5 for a specific securities similar to the one shown in the first embodiment, as well as other securities information, e.g., a wording 1 concerning the title, and a wording 2 concerning the face value and other information relaying to the securities certificate.

When the computer 21A receives the securities information including the dividend wording 3, the interest wording 4, and the warranty wording 5 (S101: Yes), it records the entered securities information into the hard disk 214 (S102), and transmits the securities information to the computer owned by the investor 22A via the network interface 217 and the network 23A (S103). The procedure of the transmission of the securities information in the step S103 can be automatically done according to the securities information input procedure in the step S101, or can be performed upon receiving the transmission request from the computer 22A owned by the investor.

In FIG. 5, upon receiving the securities information including the dividend wording 3, the interest wording 4, and the warranty wording 5 from the computer 21A owned by the investor via the network 23A and the network interface 217 (S201), the computer 22A stores the received information into the hard disk 214 (S202), and displays the same on the display unit 215 (S203).

In this embodiment, the investor can confirm the contents of the securities according to the present information from his/her office or home and instantaneously purchase any desired securities through on-line procedures using the computer 22A. Moreover, the securities company can advertise and sell simultaneously the securities according to the invention through the network alone.

Figure 6:
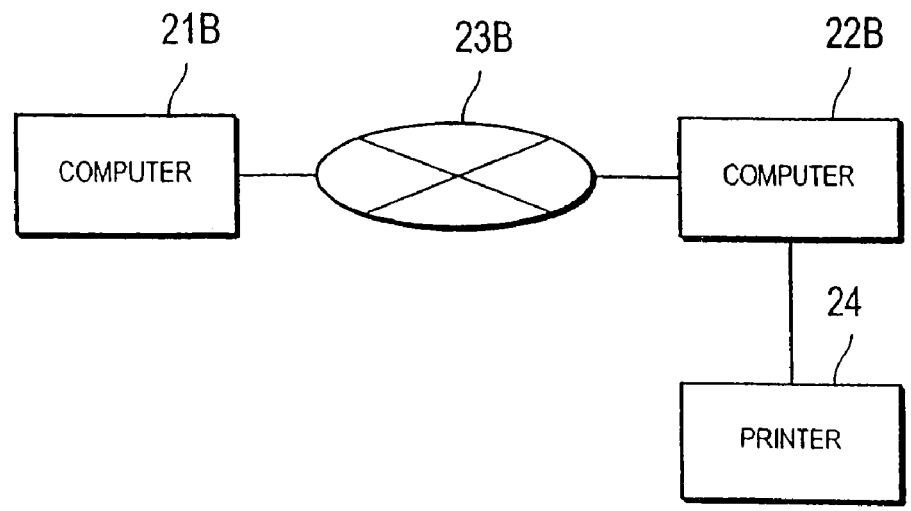
FIG. 6 is a block diagram of the overall structure of an alternative embodiment of the present invention.

FIG. 6 is a block diagram showing the entire structure of the securities information offering system according to the third embodiment of the present invention. The securities information offering system according to this embodiment comprises, similar to the case of the securities information offering system according to the aforementioned second embodiment, a computer 21B installed at a securities company and a computer 22B owned by an investor, which are interconnected communicably via a network 23B, while a printer 24 is connected to the computer 22B.

The computers 21B and 22B of this embodiment have constitutions similar to those of the computers 21A and 22A of the second embodiment.

Figure 7:
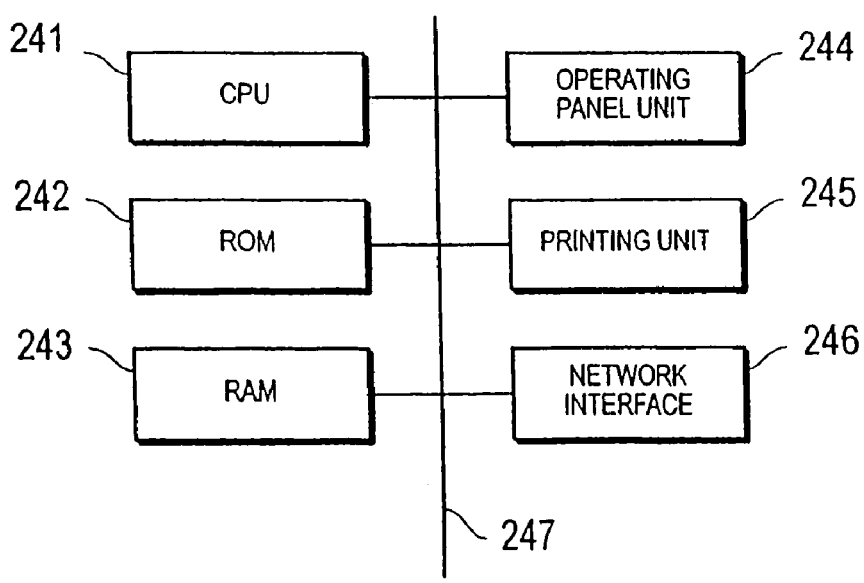
FIG. 7 is a block diagram showing greater detail of the printer depicted in FIG. 6.

FIG. 7 is a block diagram showing the constitution of the printer 24 according to this embodiment. With reference to FIG. 7, the printer 24 has, in addition to a CPU 241, a ROM 242, a RAM 243, a network interface 246, and a bus 247, an operating panel 244 consisting of a touch panel for various inputs and displays, fixed keys, display lamps, etc., and a printing unit 245 for printing image data.

Figure 8:
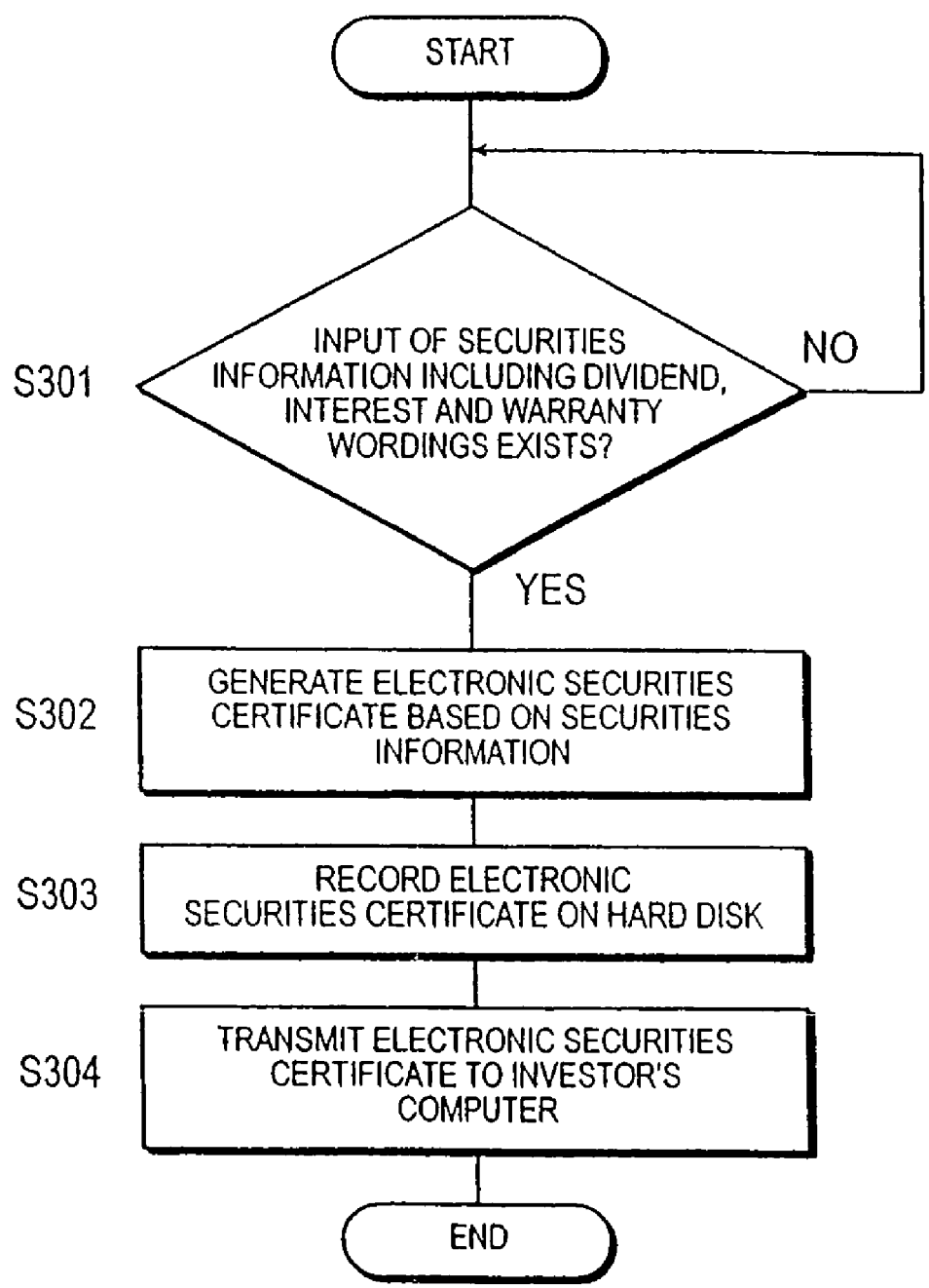
FIG. 8 is a flowchart representing a segment of a program executed by the securities company's computer according to the embodiment depicted in FIG. 6.
Figure 9:
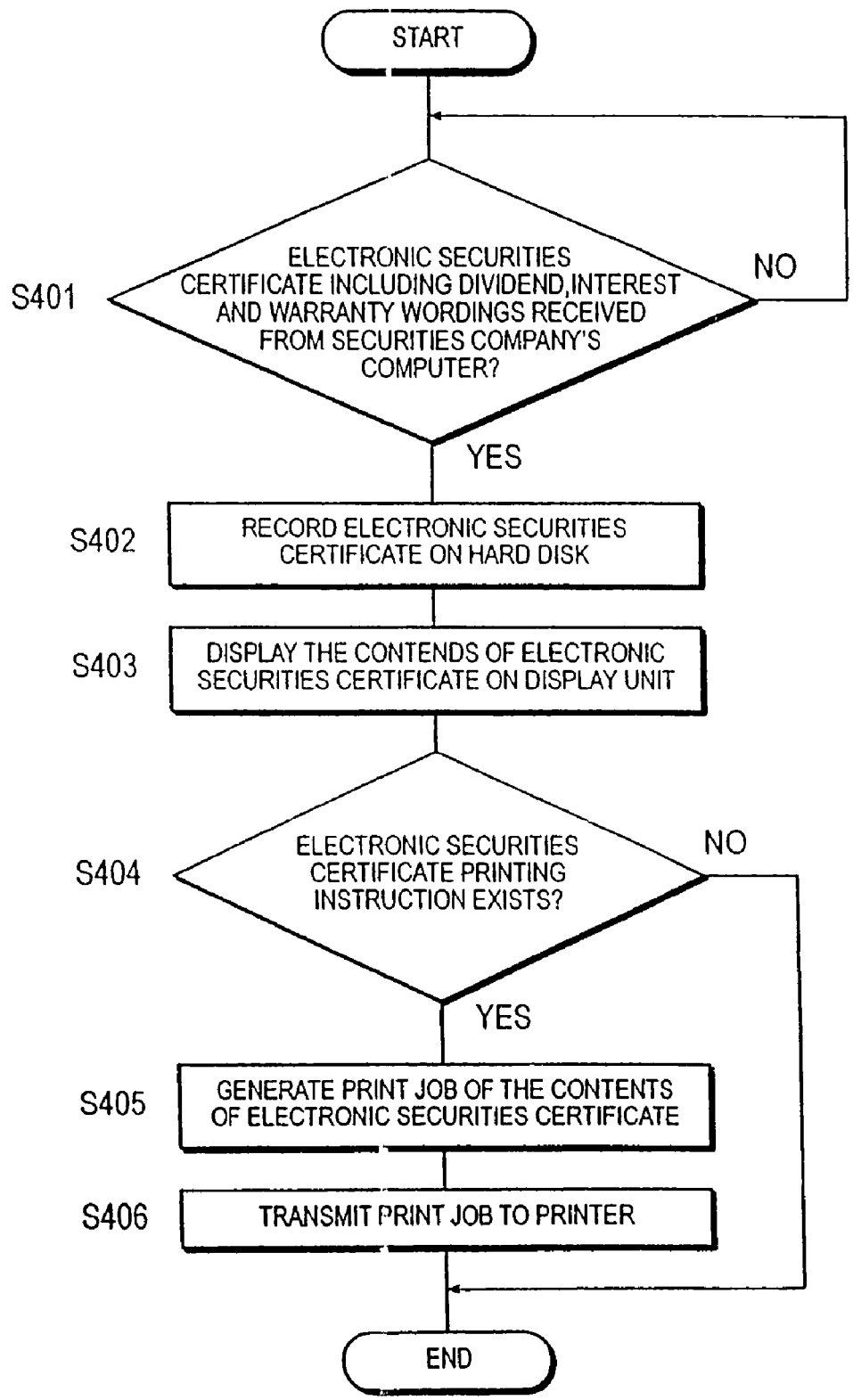
FIG. 9 is a flowchart representing a segment of a program executed by the investor's computer according to the embodiment depicted in FIG. 6.

FIG. 8 and FIG. 9 are the flowcharts showing the procedures of the securities issuing processes in the computers 21B and 22B in this embodiment. The algorithms shown as the flowcharts of FIG. 8 and FIG. 9 are stored as the control programs in either the ROM 212 or the hard disk 214 of the computers 21B and 22B respectively, and are executed by the CPU 21.

In FIG. 8, the computer 21B installed in the securities company waits for securities information including the dividend wording 3, the interest wording 4, and the warranty wording 5 to be entered (S301: No). The operator at the securities company enters into the computer 21B via the input device 216 the dividend wording 3, the interest wording 4, and the warranty wording 5 for a specific securities as well as other securities information as indicated in the aforementioned first embodiment.

When the computer 21B receives the securities information including the dividend wording 3, the interest wording 4, and the warranty wording 5 (S301: Yes), it generates an electronic securities certificate based on the received securities information (S302). The electronic securities certificate mentioned here is a version based on electronic data of the securities certificate shown in the first embodiment (FIG. 1), and contains the wording 1 for the title of the securities, the wording 2 for the face value, the dividend wording 3, the interest wording 4, and the warranty wording 5 for the specific securities as well as the electronic signature of the securities issuer (business operator) for guarantying the legitimacy of the securities certificate. Moreover, such an electronic securities certificate is provided with a specified copy protection for the purpose of preventing illegal modification or copying. The computer 21B records the generated electronic securities certificate in the hard disk 214 (S303), and transmits simultaneously the electronic securities certificate to the computer 22B owned by the investor via the network interface 217 and the network 23B (S304). The procedure of the transmission of the securities information in the step S304 can be automatically done according to the securities information input procedure in the step S302, or can be performed upon receiving the transmission request from the computer 22B owned by the investor.

In FIG. 9, upon receiving the electronic securities certificate including the dividend wording 3, the interest wording 4, and the warranty wording 5 from the computer 21B owned by the investor via the network 23B and the network interface 217 (S401), the computer 22B stores the received electronic securities certificate into the hard disk 214 (S402), and displays its contents on the display unit 215 (S403).

In this embodiment, the electronic securities certificate can be circulated through the network as the original of the securities certificate, so that the investor can purchase the contents of the securities according to the present information from his/her office or home and instantaneously obtain the certificate of any desired securities through on-line procedures using the computer 22B. Moreover, the securities company can sell the securities according to the invention through the network alone and is freed from the burden of mailing the securities certificate later.

Further, the computer 22B can be a type which prints out the contents of the electronic securities certificate by means of the printer 24, in addition to or instead of displaying them on its display unit. In other words, it is possible to provide the electronic securities with a protection electronically so that it can be printed only once, so that the only one copy of the securities certificate can be printed and circulated through the market as its original. In this case, with reference to FIG. 9, the computer 22B waits for the printing instruction of the electronic securities certificate (S404), generates a print job of the contents of the electronic securities certificate recorded on the hard disk 214 (S405), and transmits the print job to the printer 24 (S406). The printing output protection applied on the electronic securities certificate as mentioned above does not have to be a type that limits the printing to only once, but can be a multiple print type (with protection) or a no-limit type (i.e., no protection).

In another embodiment of the invention, a buy operation proceeds as follows. The customer keys in the details of the desired securities and inserts the payment card in the card reader. The ASD 105 conveys this to the securities dealing financial institution via the ASD host 101 and gets back the information (including cryptographic checksum) to print on the hardcopy certificate as well as the type of paper to use. The ASD 105 then prints the certificate on the appropriate paper, takes a scan (if needed for unforgeability, as explained later), and dispenses the hardcopy certificate to the customer. A sell operation proceeds as follows. The customer inserts a printed hardcopy certificate in the document scanner and payment method in the card reader. The ASD 105 scans the hardcopy certificate, conveys the results of the scan to the ASD host 101 for validation of a cryptographic checksum and a fingerprint (if applicable). If valid, the ASD host 101 makes payment, following which the ASD 105 voids the hardcopy certificate (e.g., prints "VOID" on it). If invalid, the transaction is cancelled.

Figure 13:
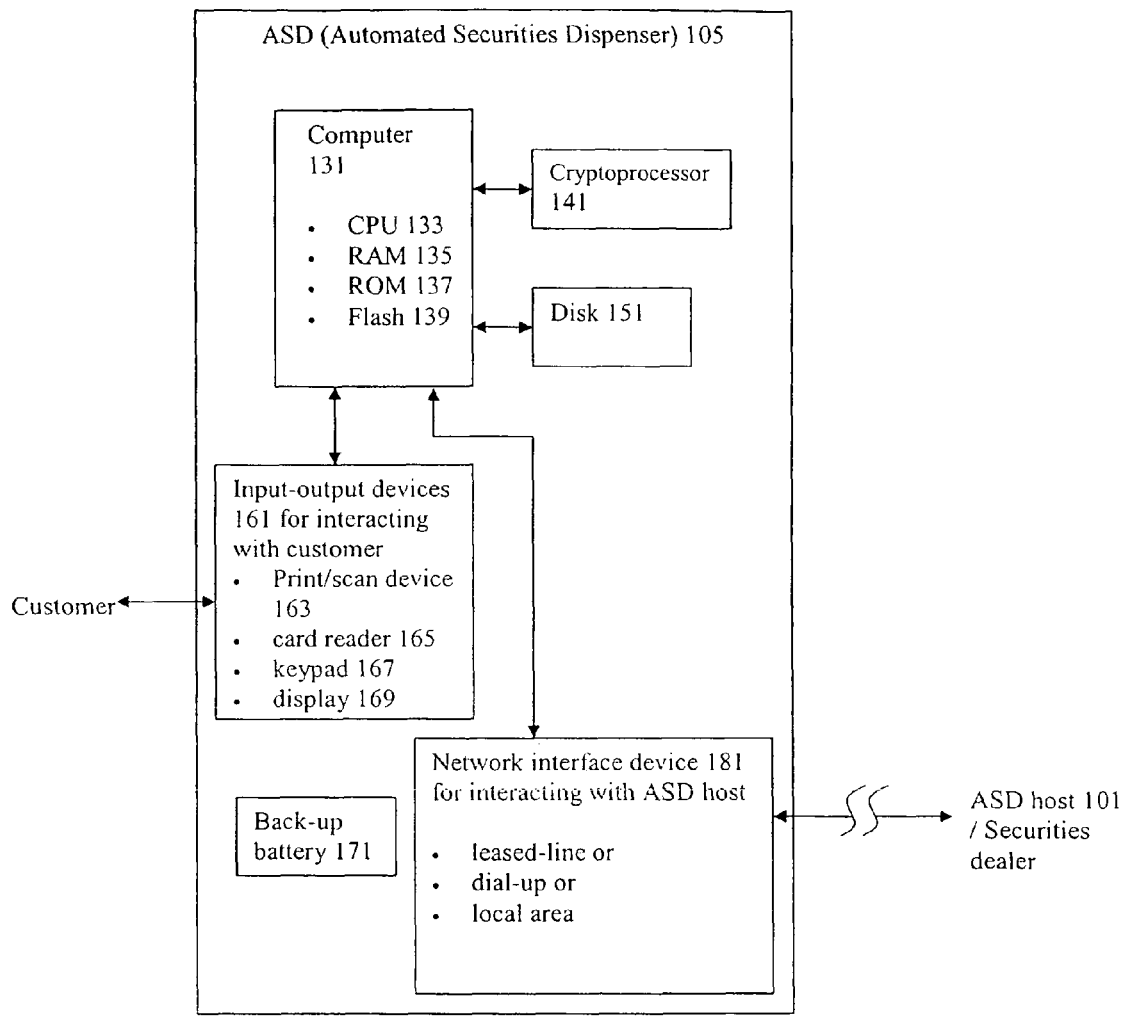
FIG. 13 shows a hardware block diagram of the issuing machine according to the invention.

The ASD 105 interacts with customers at the "front-end" and is connected to a remote ASD host 101 at the "back-end" (just as ATM machines connect to a remote ATM host machine) as depicted in FIG. 13. The ASD 105 is similar to an ATM in terms of hardware components except for a printer-scanner. The ASD 105 has a PC-like computer 131 (consisting of 1 CPU 133, a RAM 135, a ROM 139, and a disk 151) that controls the operation of the ASD. The ASD 105 also has a cryptoprocessor 141 for executing the cryptography software for secure communication between ASD 105 and ASD host 101 (and for computing cryptographic checksums, if that is done at the ASD). The cryptoprocessor is a dedicated processor embedded in a packaging with multiple physical security measures, which give it a degree of tamper resistance. The ASD 105 has the following input-output devices 161 for interaction with the customer: a print-scan device 163, a card reader 165 for retrieving a payment method (e.g., debit card), a keypad 167 for a customer to enter the details of the task to be performed (e.g., whether to buy or sell a hardcopy certificate, what kind of hardcopy certificate to buy, PIN code for the payment card), and a display 169 for informing the customer the status of the current transaction and prompts the customer for inputs.

The print-scan device 163 has the following capabilities: It has access to ordinary paper and one or more types of special paper. It can print information supplied by the computer on the type of paper indicated by the computer, take a scan of the printed document, and dispense the printed document to the customer. It can accept a printed hardcopy certificate inserted by the customer, take a scan of the document, forward the scan to the computer, then either return the hardcopy certificate to the customer or print "VOID" on the hardcopy certificate and store it locally.

The ASD 105 has a network interface device 181 for communicating with the remote ASD host 101 (e.g., modem, wireless interface, Ethernet interface). The ASD 105 has additional devices for management and administration purposes: a console (with display and keyboard) or a input-output port at which to connect a console; and a back-up battery 171 to allow continued operation and proper closing down in the event of main power failure. The print/scan device 163 also prints out paper records of transactions for auditing purposes.

Communications between the ASD 105 and the securities dealing financial institution is made secure through the use of encryption techniques. Let $K_A$ denote the cryptographic key used for securing the communications between the ASD 105 and the security dealing financial institution. ($K_A$ would be a random number whose length depends on the encryption algorithm, e.g., 56 bits in DES, 128 bits or higher in AES.) $K_A$ is stored in the ASD's cryptoprocessor non-volatile memory and in the securities dealing financial institution's computer, and perhaps authorized key escrow agents).

When the securities dealing financial institution sends data, say X, to the ASD, it first encrypts the data with $K_A$ and transmits the encrypted data, i.e., transmits $E(K_A, X)$, where E is the encryption algorithm (e.g., DES, AES). When the ASD 105 receives $E(K_A, X)$, it forwards the message to its cryptoprocessor, which decrypts $E(K_A, X)$ using $K_A$ to extract X (i.e., computes $D(K_A, E(K_A, X))$, where D is the decryption function) and passes X to the ASD 105 computer. Note that the ASD 105 computer never gets to see $K_A$, so a compromise of the ASD 105 computer does not compromise $K_A$.

The same procedure is followed when the ASD 105 sends data to the securities dealing financial institution. The ASD computer 131 uses the cryptoprocessor 141 to encrypt the data with key $K_A$, and transmits the encrypted data to the securities dealing financial institution.

When $E(K_A, X)$ is transmitted (either by the ASD 105 or the securities dealing financial institution), an eavesdropper on the communication link can obtain $E(K_A, X)$, but not X because the eavesdropper does not know $K_A$ (obtaining X from $E(K_A, X)$ without knowing $K_A$ is computationally infeasible). Furthermore, if the message $E(K_A, X)$ is intercepted and modified, then when the modified message is received and decrypted, the resulting data will be garbled (i.e., will not have the appropriate structure of X), and so the receiver will discard it. Further protection against message modification can be achieved by including in the message a cryptographic checksum generated from the contents of the message and a cryptographic key (this key is distinct from $K_A$ or the key used in protecting certificates).

The software executed by the main computer 131 of the ASD 105 includes an operating system and applications software. The operating system (e.g., Windows 2000, Linux) implements a platform on which applications software execute and control the input-output devices (e.g., issue commands to the printer-scanner, do TCP/IP networking).

The applications software includes procedures for handling "buy" and "sell" operations by the customer. These procedures prompt the customer for inputs and issue outputs, interact with the remote ASD host 101 over the network connection, and ensure that the ASD 105 and the ASD host 101 have a consistent view of the sequence of transactions performed, i.e., at the end of a transaction, either both sides have successfully completed it or both sides have completely cancelled the operation.

The applications software also includes secure networking software (e.g., Secure Shell, SSH) that ensures that the ASD's interaction with the remote ASD host 101 is authenticated, encrypted, and protected from intentional or accidental modification. The encryption itself is done by the cryptoprocessor 141. The applications software further can include optical character recognition (OCR) for verifying the cryptographic checksum therein (rather than at the ASD host 101 or the securities dealing financial institution).

Figure 14:
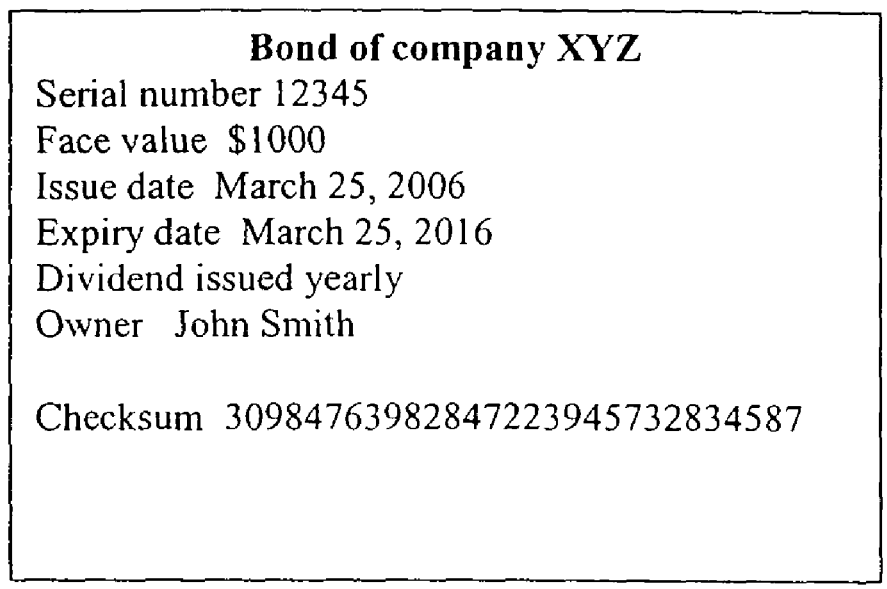
FIG. 14 shows an example of a printed security with a cryptographic checksum according to the invention.

To ensure that a printed hardcopy certificate is unmodifiable, the system uses cryptographic techniques. Specifically, it prints a cryptographic checksum (i.e., cryptographically-strong integrity checksum) on the hardcopy certificate, for example "30984763982847223945732834587" in FIG. 14. In practice, the checksum would be larger. The checksum is printed on the hardcopy certificate as a sequence of numbers or as a barcode. Producing an unmodifiable hardcopy certificate does not require special paper or high-resolution printing. The checksum is computed by applying a cryptographic algorithm (e.g., keyed-hash message authentication code (HMAC) with Secure Hash Algorithm (SHA)) to the information on the hardcopy certificate and a cryptographic key (a large number) that is held in secret by the securities dealing financial institution. This key is referred to as the certificate key (which is different from the cryptographic key that the ASD 105 uses for secure communications with the ASD 105 host). The book entitled "Network Security: Private Communication in a Public World", 2nd edition, by Kaufman, Perlman, and Speciner, ISBN 0-13-046019-2, provides guidance in developing a suitable algorithm (e.g., HMAC).

Unmodifiability of the information of a printed hardcopy certificate is achieved by the use of an appropriate cryptographic algorithm, for example, a keyed-hash function. Let $K_B$ denote the certificate key, i.e., the large random number that is held in secret by the securities dealing financial institution and used in computing the checksum for a hardcopy certificate. Let Y be the information, excluding the checksum, to be printed on a hardcopy certificate. Then the checksum for the hardcopy certificate is a large number, say $H(K_B, Y)$, obtained by applying a keyed-hash function H (e.g., HMAC with SHA) to the key $K_B$ and the data Y.

When the certificate is printed, the securities dealing financial institution sends Y as well as $H(K_B, Y)$, and the ASD 105 prints Y and $H(K_B, Y)$ on the hardcopy certificate. H is such that it is computationally infeasible to obtain $H(K_B, Y)$ without knowing $K_B$ or to modify Y to say Z such that $H(K_B, Z)$ equals $H(K_B, Y)$. Thus the information on the hardcopy certificate cannot be changed without the checksum becoming invalid. Because Y and $H(K_B, Y)$ are sent to the ASD 105 in an encrypted protected message, an attacker cannot modify the message while in transit (as explained above). Thus the printed hardcopy certificate is unmodifiable.

The certificate key $K_B$ is usually different from the key $K_A$ used to secure communications between the ASD 105 and the ASD 105 host. The securities dealing financial institution can also use different $K_B$'s for different classes of certificates (to limit the damage in case a certificate key is compromised).

The keyed-hash function is such that (1) any changes to the information on the document (such as modifying the face value) makes the checksum invalid, and (2) the valid checksum for the modified document cannot be obtained without knowing the key. Thus the checksum ensures that any modification to the information of the hardcopy certificate can be easily detected. A cryptographic checksum can also be computed using encryption functions, e.g., Data Encryption Standard (DES), Advanced Encryption Standard (AES), etc.; typically the data to be protected is encrypted with the certificate key and the final cipherblock (also called residue) is used as the checksum.

The checksum computation can be done at the securities dealing financial institution and the result then sent to the ASD 105 for printing on the hardcopy certificate. Alternatively, the computation can be done in the ASD's cryptoprocessor (in which case the cryptoprocessor would have a copy of the certificate key).

When achieving unforgeability of a printed hardcopy certificate involves taking a scan of the printed hardcopy certificate, the analysis is the same as that for unmodifiability, except that the fingerprint characterizes the printed image of the hardcopy certificate (including the random pattern embedded in the paper) rather than only the information on the hardcopy certificate.

To ensure that a printed hardcopy certificate is unforgeable, the system uses special paper. The use of special paper requires stocking the special paper. There are many types of special papers, including paper with security fibers (colored, metallic or fluorescent), paper with embedded holograms, and paper with microprinting. One can resort to paper of increasing specialization for certificates of increasing face value.

Figure 15:
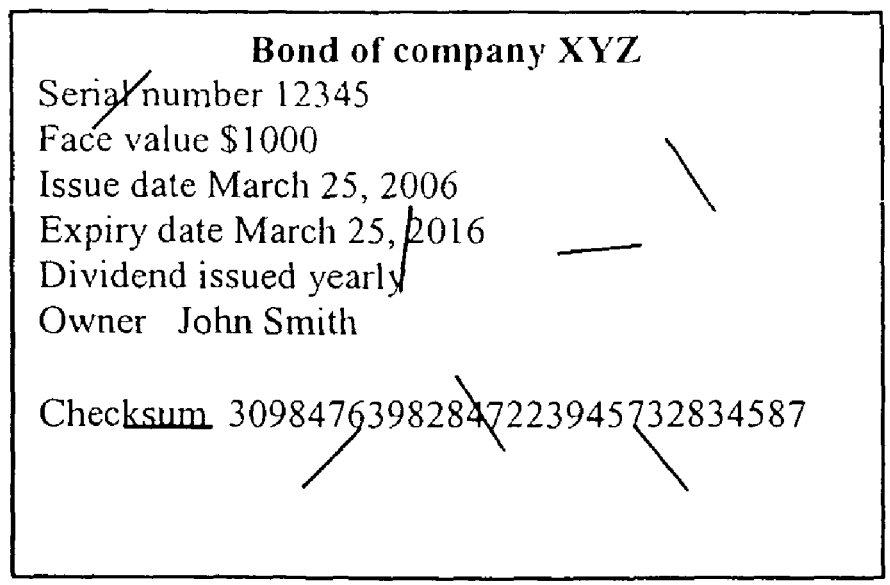
FIG. 15 Example of scan of a security printed on paper with embedded fibers (in practice there would be many more embedded fibers)

To increase the difficulty of forging a document, a random pattern is printed/embedded in the paper and the pattern will be recorded when the certificate is issued. For example, the special paper randomly embedded with colored fibers as shown in FIG. 15. To print an unforgeable hardcopy certificate, the ASD 105 uses a sheet of this special paper, records a digital scan of the hardcopy certificate, and forwards this scan to the securities dealing financial institution for storage. A duplicate of the printed security would be detectable because, even if the forger had access to the same kind of special paper, it is highly unlikely that the sheet of special paper used for the forgery would have the same random embedding of colored fibers.

An example of a "buy" operation according to the invention is explained as follows. A customer walks up to an ASD, inputs information that specifies the certificate to buy (e.g., bond X of value Y), the method of payment (e.g., debit card and PIN number), and the customer's identity (e.g., name and address). The ASD 105 contacts the securities dealing financial institution, provides payment information, and receives the details of the certificate to be printed (including the cryptographic checksum, whether it is to be printed on special paper, and if so, whether a scan is to be taken). It then prints the hardcopy certificate, dispenses the hardcopy certificate to the customer, and informs the dealing financial institution of the completion of transaction. The ASD 105 obtains a scan of the printed hardcopy certificate so printed before dispensing it to the customer, and transmits the scan to the securities dealing financial institution (via ASD 105 host) for long-term storage before finishing the transaction.

FIG. 16 provides the details of the "Buy" procedure as executed by the computer 131. Operations that involve either input or output with the customer or with the ASD host 101 are tagged as such. As usual, an input operation usually involves also some output. For example, in a Step 1, the ASD 105 displays a welcome message to start a buy transaction with a customer. In a Step 2, the user inputs his/her background information, such as name, address, social security number, etc. In a Step 3, the user inputs details of desired certificate, such as issuing company, face value, duration of certificate, etc. In a Step 4, a keycard input is preceded by a prompt on the display to the customer requesting to input the card to get details of payment method, such as bank account number, PIN, etc. if to pay by a debt card. The ASD 105 starts a transaction with the ASD host 101 by sending a network output to the ASD host 101 involving a handshake between the ASD 105 and the ASD 105 host (Step 5), and then sends details of desired certificate to the ASD host 101 (Step 6). Thereafter, the ASD 105 receives a reply from the ASD host 101 via the network (Step 7). If the ASD host's reply indicates the certificate is not available in the database, the ASD 105 informs customer by displaying the results (Step 8). If ASD host's reply indicates the certificate is available in the database, the ASD 105 sends the payment information to the ASD host 101, receives reply from the ASD host 101 indicating what to print (including a cryptographic checksum), type of paper to use, and whether a scan is to be taken. Thereafter, the ASD 105 prints a certificate on a proper paper via the print-scan device 163, as well as scans the certificate if required by the ASD host 101 and sends scanned image to the ASD host 101 accordingly. The ASD 105 dispenses a printed hardcopy certificate to the customer (Step 9). The ASD 105 prints transaction status on a local printer for recording keeping (Step 10), ends the transaction with the ASD host 101 (Step 11), and ends the transaction with the customer by displaying a message of "transaction completed".

Step 1: "start transaction with ASD 105 host" and Step 12: "end transaction with ASD 105 host" demarcate the transaction that is to be "atomically" executed with the ASD 105 host; i.e., if the transaction is not completed successfully (say the communication link failed), the state at the start of transaction is restored at both the ASD 105 and the ASD 105 host.

An example of a "sell" operation according to the invention is explained as follows. A customer walks up to an ASD, inserts the printed hardcopy certificate to be sold into the print/scan device 163 of the ASD, and inputs payment information (i.e., account to which payment is to be deposited). The ASD 105 scans the document and forwards the scan and the payment information to the securities dealing financial institution. The dealing financial institution verifies the cryptographic checksum and the scan (if applicable). If the verification is successful, the dealing financial institution makes payment and informs the ASD, which then voids or destroy the collected printed hardcopy certificate and informs the customer that the sale has been completed. If the verification is not successful, the printed hardcopy certificate is returned to the customer (or held in the ASD), and an explanation provided to the customer.

FIG. 17 provides more details of the sell procedure executed by the computer 131 of the ASD 105. As mentioned, the verification is conducted by the ASD 105, and the results are forwarded to the dealing financial institution. The ASD 105 displays a welcome message to start a sell transaction with a customer (Step 1) and prompts a message to invite the custom to insert printed hardcopy certificate into scanner (Step 2). The ASD 105 scans the inserted hardcopy certificate with the print-scan device 163 (Step 3), and gets the original payment details (bank account number, PIN, etc.) via the card reader 165 or the keypad 167 (Step 4). The ASD 105 then starts a transaction with the ASD host 101 (Step 5), sends the scanned certificate and collected payment details to the ASD host 101 (Step 6) via a network, and then receives a reply from the ASD host 101 via the network. (Step 7). If the ASD host's reply indicates the hardcopy certificate is valid and the payment was made by the customer, the ASD 105 informs the customer that the sale is accepted at a market price, prints VOID on the hardcopy certificate, and stores the voided hardcopy certificate locally (Step 8). Alternatively, the ASD 105 voids the hardcopy certificate by destroying (e.g., shredding) the inserted hardcopy certificate. If ASD host's reply indicates hardcopy certificate is invalid, the ASD 105 informs customer the result by displaying a message that certificate is invalid, and returns hardcopy certificate back to customer (Step 9). Therefore, the ASD 105 prints a transaction status on a local printer for record-keeping, ends the transaction with the ASD host 101, and ends the sell transaction with the customer by displaying a message of "transaction completed".

In another embodiment of the invention, to accommodate situations in which a purchaser sold the physical copy of the certificate to another person without informing the system, the ASD 105 accepts the certificate if the ASD host's reply indicates the hardcopy certificate is valid but the certificate was purchased by another person than the customer. As such, the circulation of the physical certificate in improved.

A validate operation is provided for the customer to verify the validity of a printed hardcopy certificate (for example, a hardcopy certificate obtained through a third party). Such a validate operation is a modification of a sell operation; instead of voiding the printed hardcopy certificate and transferring funds to the customer's account, the hardcopy certificate is simply returned to the customer after the validate operation.

An on-line conversion operation is where the customer wants to convert a printed hardcopy certificate to an online certificate to be kept in an online account with a securities dealing financial institution. This is another modification of a sell operation; instead of transferring funds to the customer's account, an on-line version of the document is transferred to the customer's account. In addition, the on-line conversion operation allows a certificate holder to sell the securities at a limit or stop order, rather than a market price as shown in FIG. 17, at the time of conversion of at a later time when the condition is satisfied. A limit order is an order to buy or sell a stated amount of stock at a specified price or better. A stop order is an order designed to trigger a trade when a stock's price rises or falls to a particular point. The price of a Buy Stop order is set above the current ASK price, and the price of a Sell Stop orders is set below the current BID price.

The certificate key $K_B$ is usually different from the key $K_A$ used to secure communications between the ASD 105 and the ASD 105 host. The securities dealing financial institution can also use different $K_B$'s for different classes of certificates (to limit the damage in case a certificate key is compromised).

The ASD 105 enables customers (1) to buy printed certificates of securities, and (2) to insert printed certificates of securities for sale or conversion to on-line certificates. The novel feature of the ASD 105 is (1) the use of cryptographic checksums to make a printed certificate unmodifiable, and (2) the use of special papers and their scans to make printed certificates unforgeable.

Investors can purchase the new financial products of the present invention that are neither stocks nor bonds, and seek profits in a new financial market that did not exist before, while business operators can obtain funds using these securities that are neither stocks nor bonds. The financial instruments according to the present invention will dig up latent private funds in private sectors to be invested into public works. Therefore, the present invention will help the national as well as local governments of various countries of the world to improve infrastructures such as roads and healthcare facilities even under a tight financial condition.

The issuing system of the invention can be applied to issue checks, commercial papers, passports, driver's licenses, identity cards, smart cards, credit cards, etc. with a cryptographic checksum printed thereon. Although the ownership of checks, banknotes, commercial papers, passports, driver's licenses, identity cards, smart cards, and credit cards are not freely transactable or transferable as securities or the fixed rate financing instruments of the invention, an issuing authority or other institutes (such as a bank) can use the cryptographic checksum to verify the authenticity of an issued hardcopy document for renewal. For example, rather than transacting securities and the fixed rate financing instruments of the invention, a bank can accept a request for issuing and renewing a casher's check (e.g., with a new expiration date) via the issuing machine of the invention. As another example, a motor vehicle authority can accept a citizen's request for issuing and renewing a driver's license via the issuing machine of the invention.

The cryptographic checksum of the invention can be applied to academic transcripts, etc. Although these documents have no ownership issues, the issuing authorities may need to verify the documents later. A school may put a cryptographic checksum on an academic transcript, then verify a copy faxed to it to see if there is any information printed thereon being modified.

The invention can be applied in conjunction with the prior art techniques, such as those previously described to generate unforgeable hardcopy documents. For example, microprinting is applied to print micro-text on a small space such as on a postage stamp or a credit card. Other examples include designating a special paper, or designating a hologram or watermark pattern impressed on a paper, or designating a high-resolution printing technique to print the hardcopy document thereon.

The invention provides a method for forming a new market by providing a server and a plurality of issuing machines connected to the server via a network.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A method executed by an issuing system to transact a newly-issued security or financing instrument, said issuing system including a server and a plurality of issuing machines connected to the server via a network, said method comprising:

receiving by one of the issuing machines an identification (ID) recording medium provided by a potential purchaser;

retrieving by said one issuing machine identification recoded in the received ID recording medium;

receiving from the potential purchaser a request for a transaction of a security financing instrument;

processing by said one issuing machine the requested transaction of the security or financing instrument by retrieving information via a network from the server;

printing out by any one of the issuing machines as designated by the purchaser said hardcopy certificate of the security or financing instrument as purchased with a cryptographic checksum thereon;

scanning by one of the issuing machines a hardcopy document inserted by a holder; and determining by said one issuing machine whether the scanned hardcopy document was issued as said hardcopy certificate of the security or financing instrument by another one of the issuing machines or an issuing machine linked with said one issuing machine according to at least a scanned cryptographic checksum.

2. The method according to claim 1, wherein the step of printing the hardcopy certificate includes printing a random pattern on said hardcopy certificate, and scanning said hardcopy certificate with the random pattern prior to providing said hardcopy certificate to the purchaser.

3. The method according to claim 2, further comprising the step of:
scanning a hardcopy document inserted by a holder, and determining the hardcopy document as not issued by an issuing machine linked with the issuing machine if the hardcopy document does not contain the random pattern.

4. The method according to claim 3, wherein the step of scanning the hardcopy document include determining that the hardcopy document as said hardcopy certificate of the security or financing instrument issued by an issuing machine linked with the issuing machine, and configuring to either purchase back the hardcopy document at a market price, or converting the hardcopy document into an electronic certificate of the security or financing instrument for the holder.

5. The method according to claim 4, wherein said electronic certificate of the security or financing instrument is sent to any e-mail account of a person or an institute as directed by the holder.

6. The method according to claim 5, wherein said institute is a securities depository or brokerage.

7. The method according to claim 6, wherein the holder sets a limit or stop order to sell the electronic certificate via the securities brokerage.

8. The method according to claim 4, wherein if the hardcopy document is determined as not having been issued by an issuing machine linked with the issuing machine, either returning the hardcopy certificate to the holder, or printing "VOID" on the hardcopy certificate and storing it locally.

9. The method according to claim 1, wherein the hardcopy certificate is the security or financing instrument.

10. The method according to claim 1, wherein the step of printing the hardcopy certificate includes printing out said hardcopy certificate with a watermark or a hologram.

11. The method according to claim 1, wherein the step of printing the hardcopy certificate includes printing out said hardcopy certificate on a heavy paper, a colored paper, a forensic fiber paper, or a paper embedded with metallic or UV sensitive threads.

12. The method according to claim 1, wherein the step of printing the hardcopy certificate includes printing the cryptographic checksum on said hardcopy certificate in a microprinting font.

13. The method according to claim 1, wherein the step of printing the hardcopy certificate includes generating said cryptographic checksum using a cryptographic algorithm and information other than said cryptographic checksum to be printed on said hardcopy certificate.

14. The method according to claim 13, wherein the cryptographic algorithm is a keyed-hash function H.

15. The method according to claim 14, wherein $K_B$ denotes a certificate key held by the server, Y denotes the information other than said cryptographic checksum to be printed on said hardcopy certificate, the cryptographic checksum is obtained by applying the keyed-hash function H to the key $K_B$ and the information Y as $H(K_B, Y)$.

16. The method according to claim 15, wherein the step of printing the hardcopy certificate further includes using a different certificate key $K_A$ to communicate with the server.

17. The method according to claim 15, wherein the step of printing the hardcopy certificate further includes using different certificate keys $K_B$ for different classes of hardcopy certificates.

18. The method according to claim 1, wherein the hardcopy certificate is a check, a commercial paper, a passport, a driver's license, an identity card, a smart card, or a credit card.

19. The method according to claim 1, wherein if the hardcopy document was determined as said hardcopy certificate of the security or financing instrument issued by an issuing machine linked with the issuing machine, the step of printing the hardcopy certificate further includes printing a renewed hardcopy certificate of the security or financing instrument with a new expiration date and a new cryptographic checksum thereon.

20. A software program embedded in a computer readable medium and executable by an issuing machine to transact a hardcopy certificate of a newly-issued security or financing instrument via an issuing system including a server and a plurality of issuing machines connected to the server via a network, said program comprising:
a module for receiving by one of the issuing machines an identification (ID) recording medium provided by a potential purchaser;
a module for retrieving by said one issuing machine identification recoded in the received ID recording medium;
a module for receiving from the potential purchaser a request for a transaction of a security or financing instrument;
a module for processing by said one issuing machine the requested transaction of the security or financing instrument by retrieving information via a network from the server;
a module for printing out by any one of the issuing machines as designated by the purchaser said hardcopy certificate of the security or financing instrument as purchased with a cryptographic checksum thereon;
a module for scanning by said one issuing machine a hardcopy document inserted by a holder; and
a module for determining by said one issuing machine whether the scanned hardcopy document was issued as said hardcopy certificate of the security or financing instrument by another one of the issuing machines or an issuing machine linked with said one issuing machine according to at least a scanned cryptographic checksum.

21. The software program according to claim 20, wherein the module for printing the hardcopy certificate is further configured to print a random pattern on said hardcopy certificate, and to scan said hardcopy certificate with the random pattern prior to providing said hardcopy certificate to the purchaser.

22. The software program according to claim 21, wherein the module for determining whether the scanned hardcopy document was issued as said hardcopy certificate is further configured to scan a hardcopy document inserted by a holder, and to determine the hardcopy document as not issued by an issuing machine linked with the issuing machine if the hardcopy document does not contain the random pattern.

23. The software program according to claim 22, wherein the module for scanning the hardcopy document is further configured to determine that the hardcopy document as said hardcopy certificate of the security or financing instrument issued by an issuing machine linked with the issuing machine, and to either purchase back the hardcopy document at a market price, or convert the hardcopy document into an electronic certificate of the security or financing instrument for the holder.

24. The software program according to claim 23, wherein said electronic certificate of the security or financing instrument is sent to any e-mail account of a person or an institute as directed by the holder.

25. The software program according to claim 24, wherein said institute is a securities depository or brokerage.

26. The software program according to claim 25, wherein the holder sets a limit or stop order to sell the electronic certificate via the securities brokerage.

27. The software program according to claim 23, wherein if the hardcopy document is determined as not having been issued by an issuing machine linked with the issuing machine, either returning the hardcopy certificate to the holder, or printing "VOID" on the hardcopy certificate and storing it locally.

28. The software program according to claim 20, wherein the hardcopy certificate is the security or financing instrument.

29. The software program according to claim 20, wherein the module for printing the hardcopy certificate is further configured to print out said hardcopy certificate with a watermark or a hologram.

30. The software program according to claim 20, wherein the module for printing the hardcopy certificate is further configured to print out said hardcopy certificate on a heavy paper, a colored paper, a forensic fiber paper, or a paper embedded with metallic or UV sensitive threads.

31. The software program according to claim 20, wherein the module for printing the hardcopy certificate is further configured to print the cryptographic checksum on said hardcopy certificate in a microprinting font.

32. The software program according to claim 20, wherein the module for printing the hardcopy certificate is further configured to generate said cryptographic checksum using a cryptographic algorithm and information other than said cryptographic checksum to be printed on said hardcopy certificate.

33. The software program according to claim 32, wherein the cryptographic algorithm is a keyed-hash function H.

34. The software program according to claim 33, wherein $K_B$ denotes a certificate key held by the server, Y denotes the information other than said cryptographic checksum to be printed on said hardcopy certificate, the cryptographic checksum is obtained by applying the keyed-hash function H to the key $K_B$ and the information Y as $H(K_B, Y)$.

35. The software program according to claim 34, wherein the module for printing the hardcopy certificate is further configured to use a different certificate key $K_A$ to communicate with the server.

36. The software program according to claim 34, wherein the module for printing the hardcopy certificate is further configured to use different certificate keys $K_B$ for different classes of hardcopy certificates.

37. The software program according to claim 20, wherein the hardcopy certificate is a check, a commercial paper, a passport, a driver's license, an identity card, a smart card, or a credit card.

38. The software program according to claim 20, wherein if the hardcopy document was determined as said hardcopy certificate of the security or financing instrument issued by an issuing machine linked with the issuing machine, the step of printing the hardcopy certificate further includes printing a renewed hardcopy certificate of the security or financing instrument with a new expiration date and a new cryptographic checksum thereon.

* * * * *